US010120983B2

(12) United States Patent
Smith, II et al.

(10) Patent No.: US 10,120,983 B2
(45) Date of Patent: Nov. 6, 2018

(54) DIGITAL RIGHTS MANAGEMENT FLEXIBLE CONTINUED USAGE SYSTEM AND METHOD

(75) Inventors: William David Smith, II, Schenectady, NY (US); Mark Richard Gilder, Clifton Park, NY (US); Virginia Ann Zingelewicz, Scotia, NY (US); William Mandel, Moorpark, CA (US)

(73) Assignee: NBCUNIVERSAL MEDIA, LLC, Wilmington, DE (US)

( * ) Notice: Subject to any disclaimer, the term of this patent is extended or adjusted under 35 U.S.C. 154(b) by 1655 days.

(21) Appl. No.: 11/639,788

(22) Filed: Dec. 15, 2006

(65) Prior Publication Data
US 2008/0147556 A1 Jun. 19, 2008

(51) Int. Cl.
*G06F 21/10* (2013.01)
*G06Q 10/10* (2012.01)

(52) U.S. Cl.
CPC ............. *G06F 21/10* (2013.01); *G06Q 10/10* (2013.01); *G06F 2221/2135* (2013.01)

(58) Field of Classification Search
CPC ...................................... G06F 21/10
USPC .................................... 705/50–79
See application file for complete search history.

(56) References Cited

U.S. PATENT DOCUMENTS

| 5,260,999 | A  | * | 11/1993 | Wyman ............................. 705/59 |
| 6,226,618 | B1 |   | 5/2001  | Downs et al. |
| 6,282,653 | B1 | * | 8/2001  | Berstis et al. .................. 726/26 |
| 6,895,392 | B2 | * | 5/2005  | Stefik et al. .................... 705/51 |
| 6,915,278 | B1 | * | 7/2005  | Ferrante ............... G06F 21/105 705/59 |
| 7,136,945 | B2 | * | 11/2006 | Gibbs et al. .................... 710/62 |
| 7,496,540 | B2 | * | 2/2009  | Irwin et al. .................... 705/59 |
| 7,558,797 | B2 | * | 7/2009  | Li |
| 7,567,987 | B2 | * | 7/2009  | Shappell et al. |
| 7,574,488 | B2 | * | 8/2009  | Matsubara ................... 709/219 |
| 7,685,643 | B2 | * | 3/2010  | Lee et al. ......................... 726/27 |
| 7,690,042 | B2 | * | 3/2010  | Rantalahti ...................... 726/27 |
| 7,890,047 | B2 | * | 2/2011  | Kidd et al. .................. 455/3.02 |
| 2002/0002466 | A1 |   | 1/2002  | Kambayashi et al. |
| 2002/0013772 | A1 |   | 1/2002  | Peinado |

(Continued)

FOREIGN PATENT DOCUMENTS

EP 1045387 A 10/2000

OTHER PUBLICATIONS

White, Ron, How Software Works, Ziff-Davis Press, Sep. 30, 1993.*

(Continued)

*Primary Examiner* — Jacob C. Coppola
(74) *Attorney, Agent, or Firm* — Fletcher Yoder, P.C.

(57) ABSTRACT

A digital rights management (DRM) scheme enables a user having a valid license to digital content to create one or more copies of the content. The number of copies is limited by the DRM scheme. However, if the user is not connected or connectable to the content provider or licensing party when additional copies are desired, the user is permitted to create one or more additional copies without deleting or disabling other copies even though the additional copies exceed the number otherwise permitted by the DRM scheme. The number of such "float" copies may be limited. Rights to such additional copies may be withdrawn during a subsequent connection session between the user and the content provider.

21 Claims, 20 Drawing Sheets

(56) References Cited

U.S. PATENT DOCUMENTS

| | | |
|---|---|---|
| 2002/0029347 A1 | 3/2002 | Edelman |
| 2002/0065732 A1* | 5/2002 | Rodgers ............. G06Q 30/0207 |
| | | 705/14.1 |
| 2002/0169700 A1 | 11/2002 | Huffman et al. |
| 2003/0009423 A1 | 1/2003 | Wang et al. |
| 2003/0084306 A1 | 5/2003 | Abburi et al. |
| 2004/0103044 A1* | 5/2004 | Vandewater ....... G06Q 30/0601 |
| | | 705/26.1 |
| 2006/0259601 A1 | 11/2006 | Soelberg et al. |
| 2007/0239617 A1* | 10/2007 | Kim ........................ G06F 21/10 |
| | | 705/59 |

OTHER PUBLICATIONS

White, Ron, How Computers Work, 7th Ed., Que Corporation, Oct. 15, 2003.*
Gralla, Preston, How the Internet Works, 8th Ed., Que Corporation, Nov. 21, 2006.*
Gralla, Preston, How the Internet Works, 6th Ed., Que Corporation, Sep. 7, 2001.*
Derfler, Frank J. et. al., How Networks Work, 7th Ed., Que Corporation, Oct. 18, 2004.*
Serrao C.,"Open Secure Infrastructure to Control User Access to Multimedia Content", Web Delivering of Music, 2004. Proceedings of the Fourth International Conference on Barcelona, Spain, Sep. 13-14, 2004, Piscataway, NJ, USA, IEEE, Sep. 13, 2004, pp. 62-69, XP010741619, ISBN:978-0-7695-2157-2.

* cited by examiner

DIGITAL RIGHTS MANAGEMENT FLEXIBLE CONTINUED USAGE SYSTEM AND METHOD

BACKGROUND

The present invention relates generally to the field of digital rights management systems, and more particularly to a digital right management technique that allows for flexibility in the sustained or continued use of copies of digital content between updating or synchronization sessions with a content provider.

Many systems have been developed and are currently in use for exchanging digital content, such as movies, music, videos, and so forth. In general, software establishing such systems falls into a general category sometimes referred to as digital rights management (DRM) software. The software typically allows for access to various content for browsing, searching and eventual license or purchase. The systems are typically designed to operate in conjunction with a specific or a plurality of operating systems, and to support specific types of fixed or portable devices, such as personal computers, handheld computers, flash-memory based players, televisions, telephones, and similar devices. Increasingly, these devices may be networked to one another to allow for a certain degree of exchange of the content between authorized devices, as well as the streaming of content from one device to another.

Future developments in DRM technology will certainly permit a wide degree of exchanging between authorized devices, as well as a merging of the functions of computers, content players, televisions, telephones, and so forth. In general, DRM technologies are based upon specific coding and decoding schemes and implement particular business rules. The business rules commonly define such factors as whether a device or content is licensed, which devices may play certain content, where the content may be converted to other media, such as compact discs, the number of times the content can be played, and so forth. The business rules may also impose expiration dates for authorized play, and provide interactive functionality for stopping, starting, replaying, recording, and so forth. Ultimately, however, goals of DRM technologies must strike a balance between recuperating costs consistent with a business model for content providers, and offering a satisfying and relatively trouble-free experience for the user.

This balance has not always been met by existing DRM technologies. For example, certain existing technologies are extremely rigid in their treatment of allowed copies of content. For example, a limited number of copies is generally permitted, with additional limits being placed on the particular devices on which the copies can be stored and played. Moving or creating copies, then, requires immediate and a priori deleting or disabling copies on some devices to permit the new copies to be stored on other devices. Some DRM schemes may even require that the user obtain on-line licenses for such operations before they can be performed. The resulting situation is often confusing and frustrating for the user, detracting from the overall experience and enjoyment of the content itself.

There is a significant need in the field, therefore, for improvements in DRM technologies. In particular, there is a need for a technique that will allow for some degree of relatively flexible rules in the continued or sustained use of existing copies of digital content between updating or synchronization activities with the content provider.

BRIEF DESCRIPTION

The present invention provides a DRM method and system designed to respond to such needs. The invention may be used with a wide range of media, content, and in various devices. In general, the technique is well-suited to the license or sale of such content as movies, music, videos, and so forth over the Internet. The invention provides for a more satisfying user experience than previous DRM approaches, particularly insomuch as they relate to the ability to continue with the use of certain copies of digital content until licenses can be updated and synchronized with a content provider.

In accordance with one aspect of the invention, a method for permitting access to digital content comprises permitting creation of a first copy of the digital content by a user in accordance with a DRM scheme, and permitting creation of a further copy of the digital content without the deletion or disabling of the first copy although the further copy exceeds a number of licensed copies allowable by the DRM scheme.

In accordance with a particular embodiment, the invention may also provide for removing permission for either the first or the further copy while the user is later connected to the content provider via a network link.

The invention also provides systems and software for performing these and other useful methods in the context of DRM content schemes.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
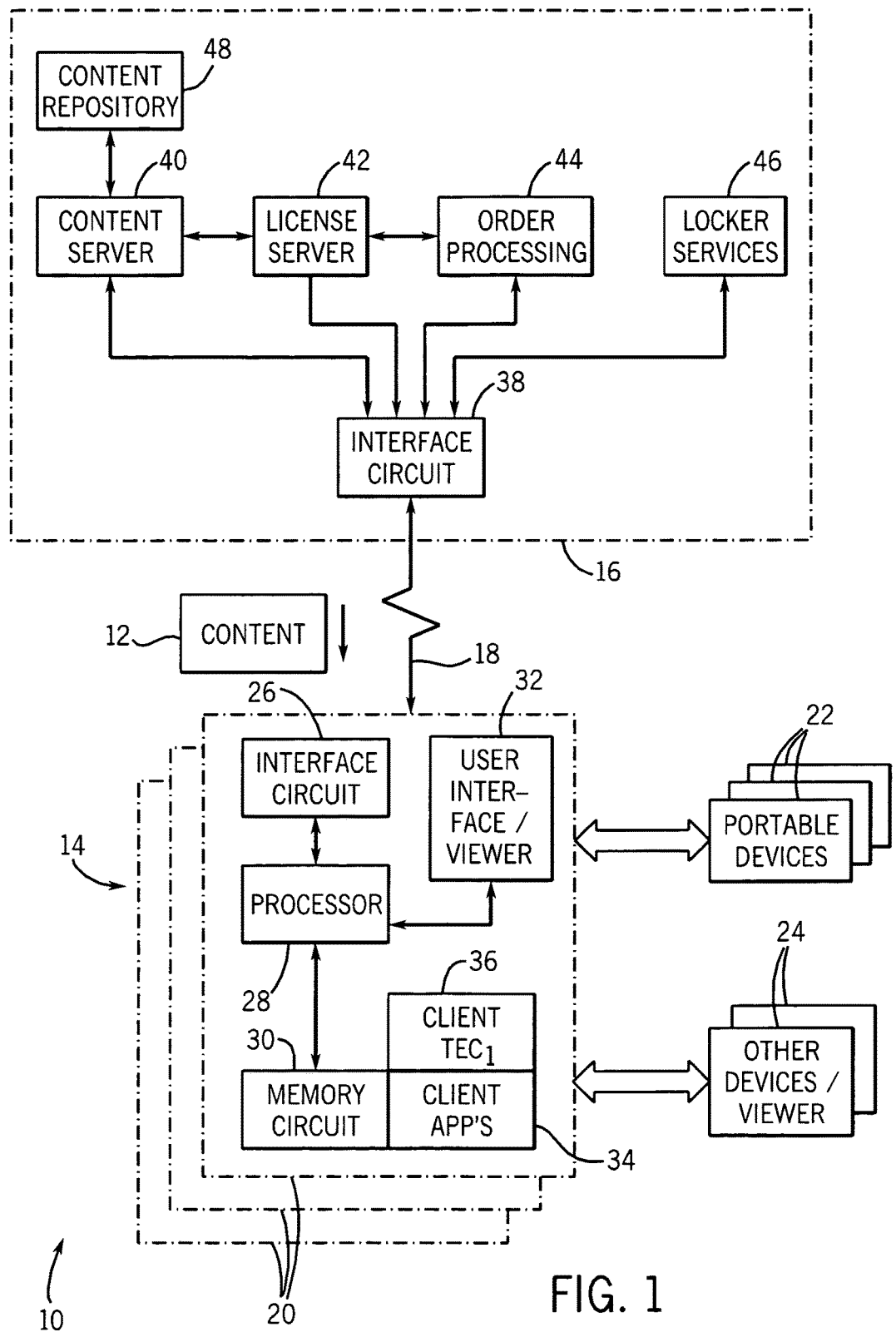
FIG. 1 is a diagrammatical overview of a DRM system designed to provide content and rights for the use of such content to users in accordance with aspects of the invention.

Turning now to the drawings, and referring first to FIG. 1, a digital content delivery system 10 is illustrated diagrammatically for delivering content 12 to users and their associated user devices, represented generally by reference numeral 14. The content is delivered by one or more content providers, represented generally by reference numeral 16. The content itself may consist of any form of digital data, particularly films, music, videos, and so forth. In the schemes outlined in the present discussion, however, the content is not intended to be limited in any way. In general, users will desire such content on a permanent or temporary basis. That is, the user may desire to view, listen to or otherwise enjoy the content and subsequently discard or erase the digital record of the content from their own devices and systems. In other situations, the users may desire to retain an archival copy or even to collect content provided in accordance with the present invention. The users or devices described below may include individuals, businesses, commercial establishments, and a host of combinations of these. In general, the devices to which the content is provided may, in accordance with present technologies, include computers such as personal computers, laptops, and so forth. More generally, however, the devices may include both stationary and portable devices, televisions, media centers, radios, telephones, vehicles, and so forth.

Throughout the present discussion, reference will be made to "content providers" generally. As those skilled in the art will recognize, in the entertainment industry, certain entities will generally generate or create content, while these or other entities will distribute, sell, or otherwise provide the content to users. These may sometimes be referred to as "service providers" or "retailers". However, in the present context, any or even all of these should be understood as included under the umbrella term "content providers." That is, a "content provider" is any person or entity that transmits content to one or more users. It is not necessary for a content provider to have generated such content, nor that the content provider owns the intellectual property rights relating to such content.

The content provider 16 is generally located remotely from the users and devices to which the content is supplied. The actual components and systems used by the content provider in the techniques described below may be physically disposed in a central location, but may more typically be distributed. That is, the content provider will typically use a number of storage devices, servers, communications devices and so forth which will be connected by a network on the content provider side. These devices are then coupled to the users and devices 14 by means of a network 18. The network 18 may include any range of network media and protocols, including conventional telephony connections, Internet connections, cabled and wireless connections, satellite connections, and so forth. Moreover, the content and data for provision of the content and regulation of its use may be communicated in accordance with any suitable protocol, such as the conventional TCP/IP protocol used for Internet communications.

For the present purposes, the discussion may focus on a single user 14 who receives content 12. It will be understood, however, that the content provider 16 will typically be in communication with thousands or even millions of such users for the provision of a host of different content. Devices, generally represented by reference numeral 20 in FIG. 1, will be at the disposal of or controlled by the user, and may be equipped for interfacing with the content provider 16 for the selection, transfer, provision and regulation of content. Moreover, a range of portable devices, as indicated generally by reference numeral 22, may be interfaced with devices 20 to either receive and play content, or receive a stream of data for viewing or playing content from one of the devices 20. Similarly, other devices and viewers 24 may be coupled to the devices 20. Such devices may include simple monitors, non-networked players, televisions, media centers, and similar devices both presently existing and developed for future receipt and playing of content. While various references are made herein to "portable" or "other" devices, these may or may not be treated differently by the DRM scheme. In particular, the term "portable" generally refers to devices that can be disconnected from the network and carried with the user (e.g., portable music players, portable computers, laptops, and so forth), while "other devices" are devices which may or may not continue to play content when disconnected from the network (e.g., desktop computers).

In general, in a present context the devices 20 may include personal computers, servers, laptops or similar components capable of interfacing with the content provider, receiving content, playing the content, storing it and operating in accordance with the rules outlined below. Certain functional components of these devices may include, for example, interface circuitry 26 which facilitates communication with the content provider via the network 18. Such interface circuitry may include modems, network cards, and so forth. One or more processors 28 is included to receive content, execute instructions for playing content, and process instructions and convey data to and from the content provider. The processors may, of course, execute a wide range of other functionalities, including all of those functionalities associated with conventional personal computers, televisions, and the like.

Memory circuitry 30 communicates with processor 28 and stores both configuration data for the device as well as content and applications for execution by the processor.

Certain of the types of applications and data stored in the memory circuit 30 will be discussed below, particularly elements such as user account information, device identity, license rights, and so forth. In general, the memory circuitry 30 may be based upon one or more conventional types of memory, including conventional hard drives, read only memory, random access memory, flash memory, dynamic random access memory, and so forth. Among the components stored in the memory circuitry will be client applications 34 and a license registry 36. The applications 34 will include at least applications capable of executing the DRM schemes outlined below, and may be provided by the content provider or by a tertiary provider, such as the maker of various multimedia software packages and players. The license registry 36, as described more fully below, will typically include a database or other data structure that stores information related to the users account, licensed or active devices, licensed or active content, the number of copies currently authorized for play by the user, and so forth.

Finally, the devices 20 will typically include a user interface and viewer as represented generally by reference numeral 32 in FIG. 1. Such interfaces will most often include, for computer-type devices, a keyboard, a mouse, a monitor, and so forth. For other devices the interface and viewer may include various dials, keypads, remote controls, and the like. In general, the interface and viewer 32 allows the user to select, access and play the content, and to interact with the content provider as outlined below.

The content provider 16, as noted above, will use a number of components which will be networked on the content provider side. To permit wide access to the content by large numbers of users and devices, interface circuitry 38 will be provided. Such interface circuitry may include conventional servers, routers, switch gear and the like that permit users to contact the content provider via the network 18, and interact with the content provider for the selection, licensing, transmission and management of content offered by the content provider. Moreover, one or a host of content servers 40 are provided which communicate with the interface circuitry to actually serve the digital content. A license server 42 is provided for storing and processing sales, licenses and license requests as described more fully in the discussion below. An order processing module 44 is provided for processing new orders or changes in orders requested by users. In accordance with certain aspects of the present technique, a locker service 46 may be provided. The locker service allows for storing and archiving of certain records relating to user rights and the restoration of content in accordance with such user rights as needed by the user. A content repository 48 will typically be linked to the content server 40 and stores the content provided to the users. The various components, particularly the content repository 48, may be located in one or more locations geographically. Moreover, certain of these components may be provided in more than one location, in a redundant or regional manner. This may be the case particularly for the content repository 48, which may include vast amounts of digital data representative of all of the content offered or provided to the various users and devices.

The content provider side components described generally with reference to FIG. 1, and the user-side devices cooperate for the selection and provision of content to the user. In general, the overall goal of the system is to provide content for the satisfaction and enjoyment of the user. Accordingly, the present invention keenly focuses upon facilitating the enjoyment of the content by the user through enhanced flexibility in the DRM strategy implemented by the content provider. The result is believed to be an enhanced, more pleasurable, and less problematic experience for the user during selection, downloading, access, playing, copying, moving, streaming and other typical operations that the user will need to employ for full enjoyment of the content.

FIGS. 2-20 illustrate various scenarios for logic implemented by the components generally illustrated in FIG. 1 during such content-focused activities. In general, the flow charts of these figures include a series of "lanes" that generally indicate on which component the various steps or operations are performed, along with certain processing operations that may be included in typical transactions or activities. The components referred to in the flow charts may generally correspond to the devices 20, sometimes referred to as the "PC" in the figures, although it should be understood that the devices are not limited to personal computers or even to conventional computers understood as such. Client applications referred to in the flow charts generally correspond to applications 34 which may form part of multi-media software packages loaded on the devices. The order processing component referred to in the flow charts generally refers to one or more computers serving as the order processing module or component 44 illustrated in FIG. 1. These may exist, as noted above, at one or more locations or installations on the content provider side. Similarly, the content server referred to in the flow charts corresponds to one or more computers or servers on the content provider side as indicated generally by reference numeral 40 in FIG. 1. The license server referred to in the following flow charts will generally correspond to license server 42 in FIG. 1, which will typically also be one or more computers or servers operating on the content provider side. The license registry service referred to in the flow charts, or the license service may be one of the functional services performed by software at one or more of the components illustrated in FIG. 1 on the content provider side, typically in the license server 42. Portable devices referred to in the flow charts will generally correspond to portable computers, handheld computers, telephones, portable players, and any other devices capable of receiving and playing content, and correspond generally to devices 22 illustrated in FIG. 1. The locker service will, again, typically correspond to one or more servers, or a software service provided in the license server 42 or other component, and corresponds to license server 46 in FIG. 1. Throughout the following discussion, however, it should be borne in mind that these components are merely exemplary, and other components may perform similar functionality within the scope of the present invention.

Figure 2:
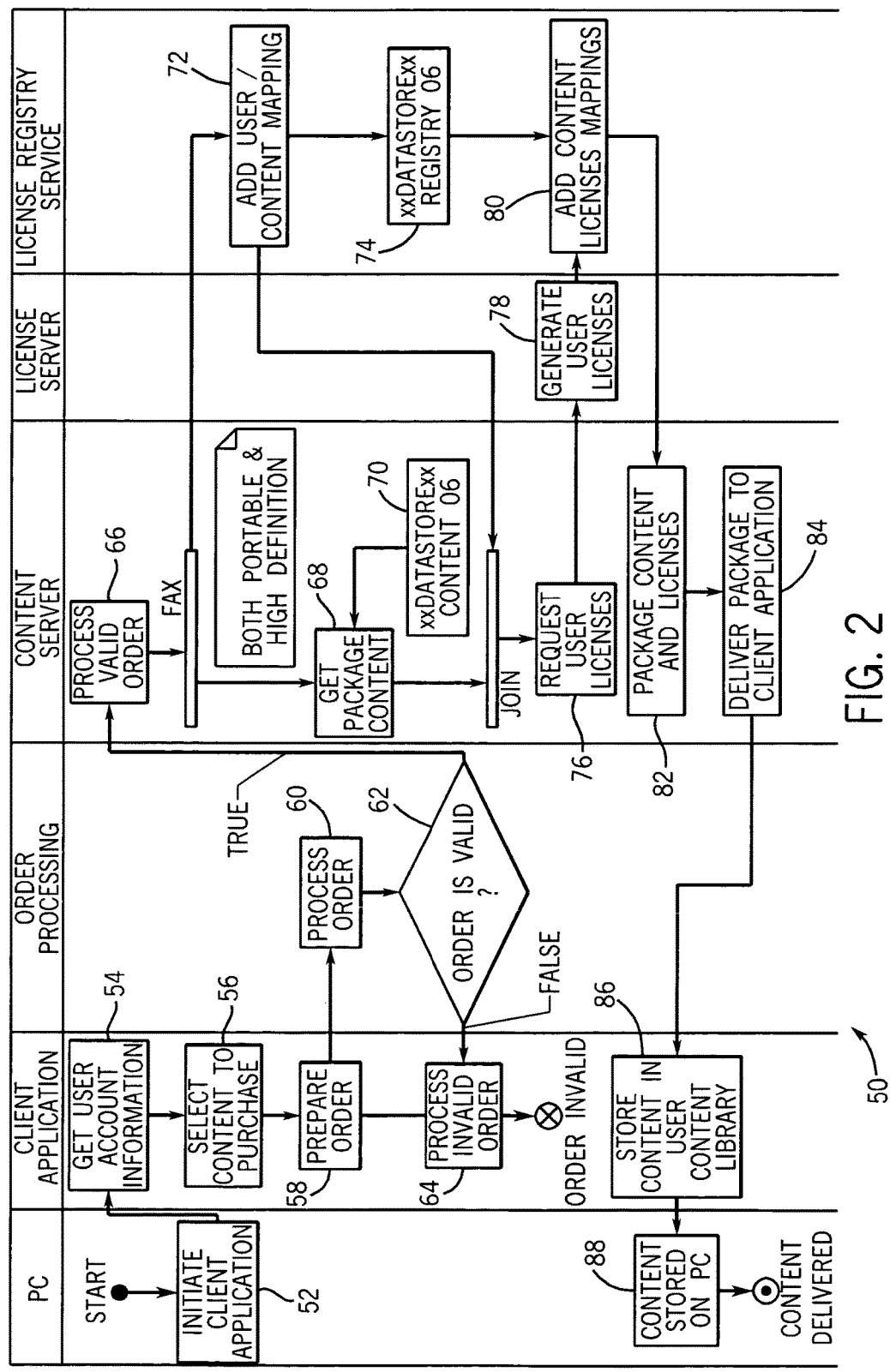
FIG. 2 is a flow chart illustrating exemplary logic in the license or purchase of content in the system of FIG. 1.

Beginning with FIG. 2, a flow chart illustrating exemplary logic involved in a purchase (or license of rights) of content is illustrated. The purchase activity, referred to generally by reference numeral 50, begins at step 52 where the application resident on the user device is initiated. This will typically be performed by selecting an icon or clicking a mouse on a multimedia software interface screen to initiate or open the application. At step 54, then, the application may request or require certain user account information. Such account information may include, for example, the user name, any required passwords, any required authenticating keys, and so forth. These steps may be performed on- or off-line, that is, while connected to the network or prior to connection to the network. At step 56, then, content that the user desires to purchase or license is selected. This will typically be performed in any conventional manner, such as by allowing the user to navigate to a specific content while on-line. Various browsers and interfaces may be employed for this purpose.

Once the user has selected desired content, then, an order is prepared as indicated by reference numeral 58. Again, this order may be prepared in any conventional manner, and the particular interface for preparing the order will typically be provided as a part of the multimedia software. Such order preparation may require input of information describing the user, information describing devices and device capabilities, as well as payment information, typically account information or credit card information. Certain information required for the order, or desired by the content provider may be acquired in conventional manners directly from the device, without requiring input by the user. Following preparation of the order, then, the order is submitted via the network to the content provider, and processed as indicated by reference numeral 60. Processing of the order may include verification of payment means, payment rights, and similar information. If the order is validated after such processing, in a step indicated at reference numeral 62, the valid order is processed as indicated at step 66 by the content server. If a problem exists in the order, including problems with the information provided by the user, particularly payment information, an indication of such invalidity is returned to the user as indicated at step 64 and the order is required to be corrected or otherwise resubmitted.

At step 66, then, the order is processed by accessing the content requested by the user from the content repository. This content may, of course, include any suitable content format, including formats for use on conventional PC's portable devices, televisions, to mention only a few. The content will typically be drawn from a content database or repository as noted by step 70 in FIG. 2.

In parallel with access the content, then, the license registry service of the content provider will add a user/content mapping to its records, as indicated generally by reference numeral 72. This mapping will include entry into the content provider records of an association between the user, the content provider, and the license accorded the user by virtue of the transaction. The information is then entered into the registry database maintained by the content provider as indicated by reference numeral 74.

Prior to delivery of the content to the user, then, the content server will request user licenses from the license registry service as indicated generally by reference numeral 76. This license request is transmitted to the license server as indicated at step 78 which generates the user licenses based upon information in the registry database. At step 80, then, based upon the license issued by the license server, a content/license mapping is added. With the relationship thus established between the user, the content and the license, the mapping is supplied back to the content server and the package of the content and license or licenses is compiled as indicated at reference 82. The content and licenses can then be delivered to the client application as indicated by reference numeral 84. This is typically performed via the same network link used to receive the order, and in the same connection session. At step 86, then, the content is stored along with reference to the license.

The license information will be stored on the user side in the license registry referred to above, which will link the content to the license for later use in performing operations such as playing, moving, copying, and so forth on the content. At step 88, then, the content is stored on the user device for immediate or later playing and other operations described below.

An important aspect of the present technique is a move away from "individualization" of content to a media player. As will be appreciated by those skilled in the art, DRM approaches have typically relied upon such individualization in which there is an explicit binding between the player, content, and device—in other words, content is bound to a particular user on a particular device and can only be played via a specific player. That is, individualization generally makes players unique to particular devices, typically a host computer, and creates a link between them. Such approaches have proved to be unduly constraining on users and devices, detracting from the experience and pleasure intended by the user's selection of the content. Moreover, the techniques described below are intended to enhance the flexibility of access and playing of content by implementation of enhanced rules regulating the use and copying of the content. In general, the approach outlined in the present discussion may be used regardless of how the content arrives at a particular device, whether by peer-to-peer or point-to-point copying, uploading, downloading, and so forth. However, enjoyment of the content is nevertheless regulated by the DRM license approach described below.

Figure 3:
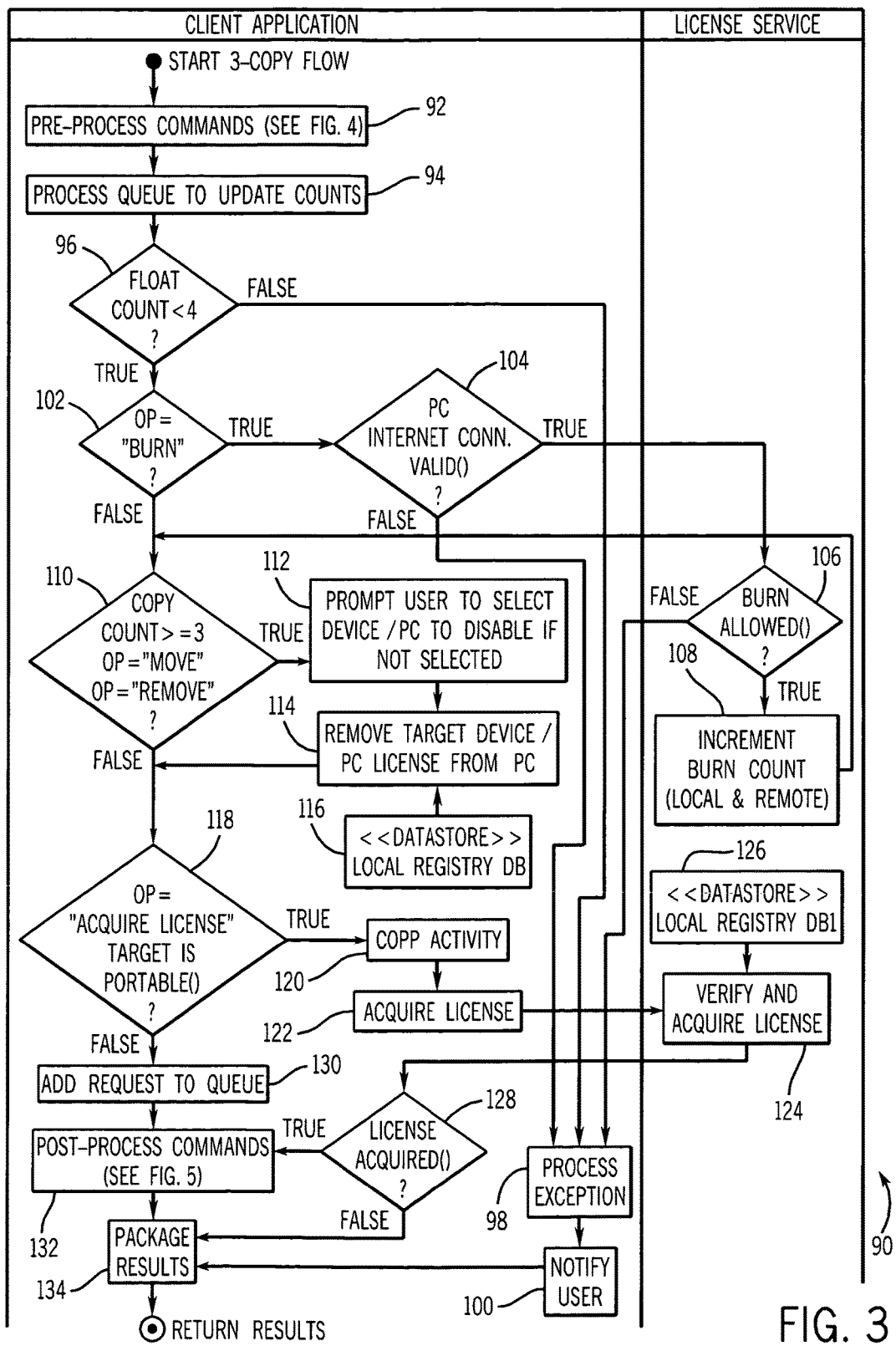
FIG. 3 is a flow chart illustrating exemplary logic for regulating the number of copies allowed to be simultaneously used in various ways by a licensed user or device or family of devices in accordance with the invention.

In general, with content provided in accordance with the purchasing activity outlined in FIG. 2, or indeed with content having been provided by any other transfer to a device, use of the content is regulated in accordance with logic summarized in FIG. 3. Because a number of copies of the content are permitted simultaneously on the user side, the logic of FIG. 3 may be referred to as multi-copy or 3-copy rules. However, while a 3-copy rule scheme is presently contemplated, it should be borne in mind that the particular number of simultaneously accessible copies is not limited to three, and more or fewer copies may be permitted to be simultaneously used by the user.

Turning to the logic outlined in FIG. 3, then, as referred to in subsequent figures describing the use of the content by the user, the multi-copy scheme 90 begins with certain pre-processing commands at step 92. These pre-processing commands will be described in greater detail with reference to FIG. 4. Following the pre-processing commands, a process queue is developed to update the number of counts of currently existing copies of the particular content on the user side, as indicated generally by reference numeral 94. In general, this queue captures the current state of commands not yet processed by the server. Because the steps illustrated in the client application column of FIG. 3 are carried out on the client side, the queue may be established while the user is off-line. The processing queue allows the content provider subsequently to update the current count number once the information is available by virtue of the user going on-line. Moreover, this queue is used to process events in a local fashion for any portable devices which are connected to the device on which the client application is running. The local queue may also enable enforcement of the number of copies and rights while the computer is not connected or connectable to a content provider.

As noted above, the present approach to digital rights management allows for several copies of content to be simultaneously operative (e.g., viewable, or otherwise playable) on the user side. The content may be thus transmitted from one device to others on the user side, so long as the number of simultaneous copies permitted by the DRM scheme (called "counts" in the present discussion) is not exceeded. An interesting aspect of the present scheme, however, also resides in the ability to "float" or maintain workable copies beyond the normal number or count permitted by the DRM scheme. It has been found, in general, that the user's experience can become extremely frustrating when the DRM scheme precludes transmission or copying from one user device to another simply because the user is not or cannot be on-line to authorize or to obtain authorization of such transfers, or because other copies on other devices have not yet been deleted or otherwise disabled.

Accordingly, the scheme outlined in FIG. 3 allows for a parameter called "floatCount" to be monitored such that the user can, at least temporarily, transfer content to additional devices without having the device that is relinquishing the license be on-line to give up its license for this transaction. In this case, the relinquishing device is granted a "floating" license that will be updated once it is connected to the content provider, and the new device receives a full license. This monitoring is generally summarized by step 96 in FIG. 3. In a present implementation, however, the number of simultaneous copies permitted on the user side is limited and the number of float copies is also limited. Thus, at step 96, if the number of float copies (copies in excess of the permitted number, three in the present embodiment) exceeds three, an error is notified to the user, as indicated generally at reference numeral 98. This error denoted "process exception" in the present discussion, is followed by a notification to the user as indicated at step 100. That is, in addition to the three copies permitted by the present DRM scheme to be run simultaneously on various devices licensed by user, three more copies can be run at least until the license rights are updated. Thus, incertain examples, creation of the further copy is permitted only if the number of copies previously created in excess of the licensed copies allowable by the DRM scheme is not greater than a predetermined maximum. As with the overall number of permitted copies, the number of float copies can, of course, be altered. Moreover, in general, permission for either the first or the further copy my be removed after a predetermined time period, Lastly, where the user is connected to the content provider, certain of these transactions can be immediately updated with the content provider records. When the user is off-line, however, these transactions will simply be added to the local process queue.

At step 102, the application may determine whether the user has requested a "burn" operation. The burn operation will typically include creating an archival copy to a compact disc or other digital medium. If the operation being performed by user is such a burn operation, the application determines whether a valid network connection with the content provider has been established, as indicated at step 104. If no connection is ongoing (i.e., the user is not on-line), a process exception is noted and notification is provided to the user, as indicated again at steps 98 and 100 respectively. If the user is on-line, the license service may allow such burns depending upon the number of burns permitted by the content provider. For example, the user may be allowed to establish one such archival copy on permanent media. In such case, the operation is allowed after step 106, and a burn count is incremented at step 108 both in the content provider records and in the local license registry. The burn operation may then continue. If the burn operation is not allowed at step 106, such as due to a number of permitted burns already having been performed by the user, a process exception and notification result as before.

It should be noted that other similar schemes for controlling burns of the content by the user may be envisaged. For example, a burn count may be checked and augmented locally on the device without requiring that the user be on-line. However, in the present implementation, on-line verification of burn rights is implemented.

If the operation being performed by the user was not a burn, or if following a burn the user requests the making of copies on other devices, step 110 implements the multi-copy or, in the present implementation, the 3-copy rule. That is, the application checks the number of copies of the content made by the user on different devices in the local license registry. If the number of copies does not exceed three in the present implementation, processing can continue to subsequent steps, step 118 in the present implementation. If the number of copies already made by the user and active is equal to or exceeds three, the user is prompted to select a device to disable if such a device has not already been selected, as indicated at step 112. That is, to allow for copying to an additional device, the user must disable or remove the content from one of the devices in which a copy has been made. At step 114, then, the target device (the device from which a copy is to be removed) is then removed from the local license registry. The license registry is accessed and updated, then, as indicated at step 116.

It should be noted, however, that while off-line, the user is still permitted, in accordance with certain aspects of the present technique to maintain "float" copies in excess of the strict number of copies that can be authorized. These float copies are, however, merely temporary and disabling copies on more than three devices will be required when the user is next on-line with the content provider. It may be noted that it is possible to copy content to portable or other devices in excess of the strict 3-copy (or multi-copy) rules. Anytime the normal limit in the number of allowable copies is exceeded, a target device must be selected from which to remove the license, as indicated at step 114 above. When that target device eventually connects (i.e., is on-line), the license will be removed. Also, the peer-to-peer situation is also handled. If the content is directly copied from one system to another via peer-to-peer, or any other transport, independent of the mechanisms described above, then upon playing the content (which is regulated by the present DRM scheme) a license will be requested. This license request will be sent to the license server, the server having been specified when the content was packaged. Hence, the 3-copy (or multi-copy) rules will be checked directly by the license server prior to issuing the license, as indicated above at step 124, in which the verification is actually performed against counts indicated in the server.

Following step 114 and if the copy count does not equal to or exceed three at step 110, a license for an additional copy on a new device may be obtained to permit a copy to be formed on that device as indicated at step 118. At step 118, the application determines whether the user desires to acquire a license for an additional device, such as a portable device. If the license is desired to be acquired in this way, a step 120 may, optionally be performed for compliance to certain industry standards, typically referred to as certified output protection protocol or COPP. The COPP activity step 120 is described in greater detail below with reference to FIG. 20.

If the license for an additional device was requested by the user at step 118, a request for license is established at step 122. This license request is added to the local queue or immediately processed if the user is on-line. The request may be a general license request with specific license parameters if any, such as for COPP compliance. The license request is then transmitted to the content provider license service where the license rights are verified at step 124 based upon the local database registry indicated by reference numeral 126. As noted above, while the number of simultaneous copies used on different devices is less than 3, such additional devices will be permitted to receive and play copies of the content by issuance of a license. Again, the particular number of simultaneous copies can be different than three. The issuance of the license, noted by the license service, is then transmitted back to the client application and the application determines whether the license was received as indicated at step 128. If no license was received, then, an end step 134 is encountered, which is also encountered following process exceptions and user notifications mentioned above. If the license is permitted, the application proceeds from step 128 to step 132 for post-process commands, explained in more detail with reference to FIG. 5. Returning to step 118, if the operation requested by user is not the acquisition of an additional license such as for a portable device, the processing would have continued to step 130 where the operation being performed by the user is added to the process queue. Following step 130, then, the post-process commands of step 132 would again be encountered.

The various operations and transactions performed by users in accordance with the scheme outlined in FIG. 3 may be "parameterized" to facilitate adaptability of the DRM scheme to the desires of various content providers, users, and situations. For example, the maximum count or number of simultaneous copies permitted by the system for a particular user of particular content could be a variable in the application that could be set by the content provider. Similarly, the number of float copies (copies not specifically authorized but permitted to subsist until a subsequent updating of the license registries) could similarly be a variable that could be set by the content provider. Such parameterization may facilitate establishing various types of user accounts, such as for distinguishing standard accounts from various premium service accounts. That is, a simple database or data structure could be established for reference when the user requests licenses, additional copies, and so forth, with different parameters for different levels of rights being established by reference to the database or data structure.

It should also be noted that in addition to verifying the counts, floats, and various licenses in the manner outlined in FIG. 3, the DRM scheme may implement various types of rate limiting for operations performed. For example, the application may permit certain movement of content between devices, adding of content to devices, adding or removing devices from the licensed listings, and so forth, but limit the frequency with which such operations may be performed. Such frequencies may, for example, be limited in terms of hours, days, weeks, months or even years.

Figure 4:
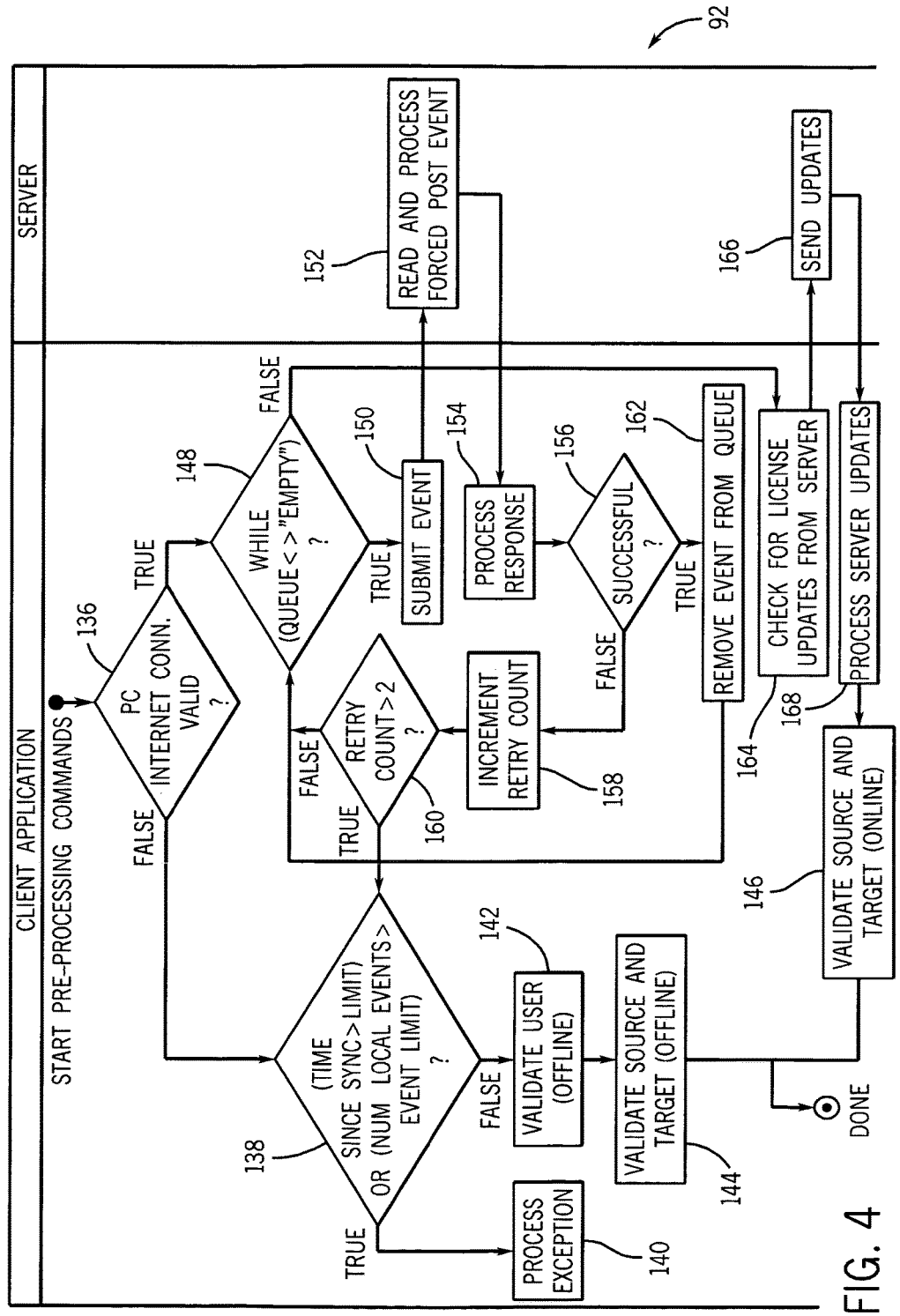
FIG. 4 is a flow chart illustrating exemplary pre-processing logic for the copy management scheme outlined in FIG. 3.

The pre-process commands summarized at reference numeral 92 in FIG. 3 are illustrated in greater detail in FIG. 4 in accordance with a presently contemplated embodiment of the invention. As shown in FIG. 4, the pre-processed commands 92 begin with step 136 where a determination is made as to whether the user device is on-line. If no valid connection is determined to exist at the time the commands are executed, the application proceeds to step 138 where a determination is made as to whether a synchronization has been performed within a particular time span. For example, step 138 may be used to limit the number of float copies allowed to the user if a synchronization of the local license registry and the content provider registry has not been updated within a particular timeframe, such as thirty days. As with the accounts and other specific values used in the present technique, this time limit may be parameterized such that a specific content provider may allow more or less time between synchronizations. If the time detected at step 138 has exceeded the allowed limit, a process exception is noted at step 140, similar to that noted at step 98 in FIG. 3. If the time limit has not been exceeded, an off-line license may be allowed as indicated at step 142, and a note of the license is added to the local license registry, and the event is noted and added to the local process queue as indicated above with reference to step 94 in FIG. 3. At step 144, then, a valid source and target is identified for the off-line allowed transaction, and the application proceeds to step 146 where eventually the same information is obtained when the user is next on-line.

Returning to step 136, if the user is on-line when the pre-process commands are executed, the application proceeds to step 148 where a "while" loop is initiated to proceed through the process queue. If the process queue has not yet been exhausted (i.e., transactions are still in the queue to be processed), the next transaction or event is submitted to the server as indicated at step 150. The server then processes the transaction or event as indicated at step 152, depending upon the nature of the request or event. A response is then returned from the server as indicated at step 154, and it is determined at step 156 whether the posting or processing of the event in the queue was successful. If the processing or posting of the event were unsuccessful, a retry counter may be incremented as indicated at step 158. A set number of retries may be allowed, such as two or three. In the present embodiment, if the retry counter exceeds two retries, as indicated at step 160, processing returns to step 138, where an off-line transaction may be permitted. Until this value is reached, processing will return to step 148 to retry the event submission. Ultimately, if the event submission is successful, the event is removed from the queue as indicated at step 162, and the while loop is continued by returning to step 148 until all processing in the queue is performed.

Thereafter, the application proceeds to step 164 where the server is checked for license updates. If an update is present in the content provider server, as indicated at step 166, such updates are returned to the user device and processed as indicated at step 168. Such processing will typically include authorization of devices, authorization of particular copying, moving, burning, and so forth, and will typically synchronize the local license registry with the records kept by the content provider. Thereafter, the application proceeds again to step 146 as before. In general, the pre-process commands of FIG. 4, which may of course be altered depending upon the needs of the content provider, may be used to synchronize the local and content provider records prior to execution of additional transactions summarized in FIG. 3 and discussed in greater detail below.

Figure 5:
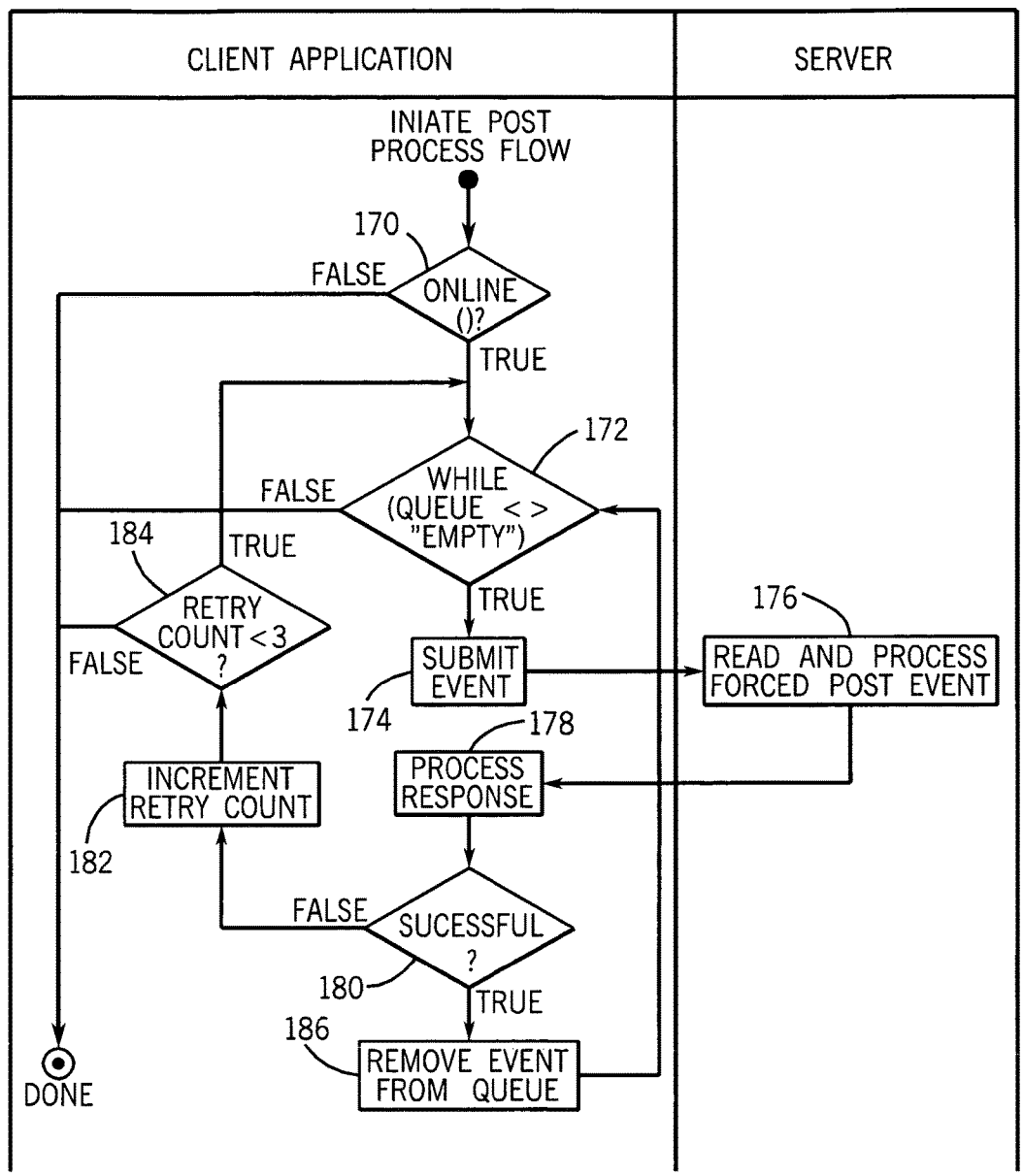
FIG. 5 is a flow chart illustrating exemplary post-processing logic for use in the scheme of FIG. 3.

FIG. 5 represents exemplary logic carried out in the post-processed commands as summarized by reference numeral 132 in FIG. 3. In the illustrated embodiment, such logic begins with determining whether the user is on-line as indicated at step 170. If the user is not on-line, the post processing command routine may end. If, however, the user device is currently on-line, processing may proceed to step 172 where a while loop is initiated to proceed through transactions or events currently in the queue following any of the activities performed in accordance with the logic of FIG. 3. That is, processing will advance to step 174 where any events in the processing queue are submitted to the server in a manner similar to step 150 of FIG. 4. The server then reads and processes the event at step 176, in a manner similar to the activity performed at step 152 in FIG. 4. The result of the processing is returned to the client application as step 178, and at step 180 it is determined whether the posting or processing of the event was successful. If not, the application may increment the retry counter in a manner similar to the activity performed at step 158 in FIG. 4, and re-attempt the posting or processing of the event. Again, a step 184 may then determine whether an allowed number of retries has been exceeded, and if not the while loop can be re-entered until the number of allowed retries is exhausted. Ultimately, when posting or processing of events is successful, the event is removed from the queue as indicated by step 186. When the queue is exhausted, or when the number of retries is reached, the post-processing commands end. The post-processing commands summarized in FIG. 5, then, permit for processing of new activities, transactions and events performed by the user while on-line.

Figure 6:
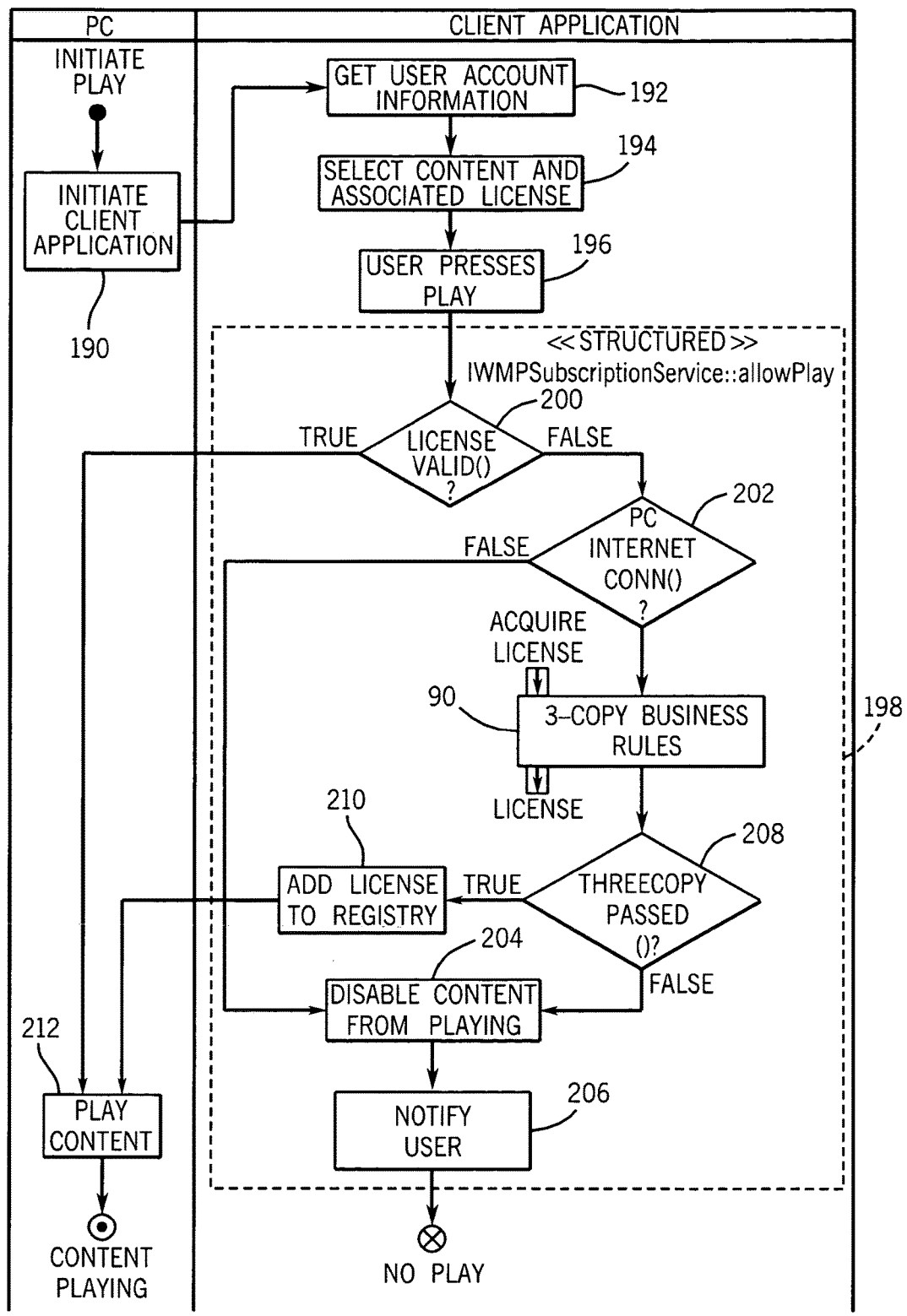
FIG. 6 is a flow chart illustrating exemplary logic for playing content consistent with the scheme summarized in FIG. 3.

The functionality implemented by the logic of FIGS. 3, 4 and 5 may be used in conjunction with a range of activities that can be performed by the user once content is obtained. A number of these scenarios are summarized in the subsequent figures. Beginning with FIG. 6, for example, exemplary logic for playing content is illustrated. In the diagram of FIG. 6, it may be noted that these operations may be entirely performed while the user is off-line. Indeed, there is no specific requirement for playing content that the user be on-line (as long as the user has already obtained a valid license), enhancing the usability of the content with various devices, including devices that are not equipped for network connectivity with the content provider.

For playing content, the user device initiates the client application as indicated at step 190. As noted above, such application initiation may typically include selecting or initiating (i.e., running) a multi-media application or player. At step 192 the client application obtains the account information, such as the user identification, information on particular devices, content, and so forth. At step 194 the user may select content and the application determines the license rights associated with the content, such as by reference to the local license registry. At step 196 the user initiates playing of the content in any suitable manner, such as by depressing an actual or virtual button, activating a remote control or any other suitable manner. The subsequent processing performed by the client application, then, involves analysis of the license rights associated with the user and the content, and any devices on which the content is loaded for playing, as summarized generally by reference numeral 198.

The steps included in the evaluation of the license rights performed in block 198 implement the 3-copy business rules (or more generically the multi-copy rules) indicated by reference numeral 90 in FIG. 6, and explained above with reference to FIG. 3. In general, at step 200 in FIG. 6, the application will determine whether a valid license is associated with the content and the user and device. If such is the case, the device is allowed to play the content as indicated at reference numeral 212. If no license currently exists for the content, associated with the user and device, the application determines whether the device is currently on-line as indicated at step 202. If the device is not on-line, and no valid license exists, the content may be disabled from playing as indicated at step 204. A notification is provided to the user of this fact as indicated at step 206. If, however, the device is on-line, the logic of FIG. 3 is invoked to acquire a license as summarized above with reference to step 118 in FIG. 3, with the other steps of the logic of FIG. 3 generally being performed as well. Once the license is obtained and the license service and local registry are updated in accordance with the logic described above, a notice that the rules were complied with (i.e., a license is permitted) is sent to the user device as indicated at step 208. If the logic of FIG. 3 has resulted in the successful issuing of a license, the license is added to the local registry as indicated at step 210, and, here again, the content is allowed to play as indicated at step 212. If, however, following the logic of FIG. 3 no license is allowed to be issued for the content or device, an indication of this is returned to the user and the content is disabled from playing. This may be the case, for example, where the user has exceeded the number of devices on which the content can be simultaneously played, or would exceed this limit if the content were authorized to be played. As noted in FIG. 3, for example, this may arise when the number of float copies exceeds the permissible number, where the number of burned copies would exceed the number of permissible burns, and so forth. Where a user has obtained an unauthorized copy, this copy may be enabled by obtaining a license, or may be disabled by the absence of such a license, or the refusal of the license by the logic of FIG. 3.

It should be noted that in the logic summarized in FIG. 6, a "float" copy was not feasible to avoid the consequence of block 198 because no valid license was detected. The present concept of a float copy, on the other hand, will generally allow the user to make additional copies beyond the number otherwise allowed, such as to load content onto other devices, although other active copies have not yet been removed or disabled, as would otherwise be required for compliance with the DRM scheme. For example, a user may view content at a home viewing station, and wish to finish viewing the content at a work viewing station. Ordinarily, without the ability to use the float copy, the user may be required to immediately remove the copy from the home system. The concept of float copies, then, works to allow devices to play content even if the content is not removed from other devices and the overall number of copies temporarily exceeds the number normally imposed by the limits of the 3-copy (or multi-copy) rules. Float copies are only allowed, however, if a valid license for the content does exist for a user on the device playing the content. In presently contemplated embodiments, therefore, a device on which content is newly loaded for playing must nevertheless obtain the license, while a device from which the copy will need to be removed may continue to play (at least until the next synchronization) the content based upon the number of allowed float copies. The license arrangements are then updated, and the content may be required to be removed from one or more devices during the next synchronization session.

Figure 7:
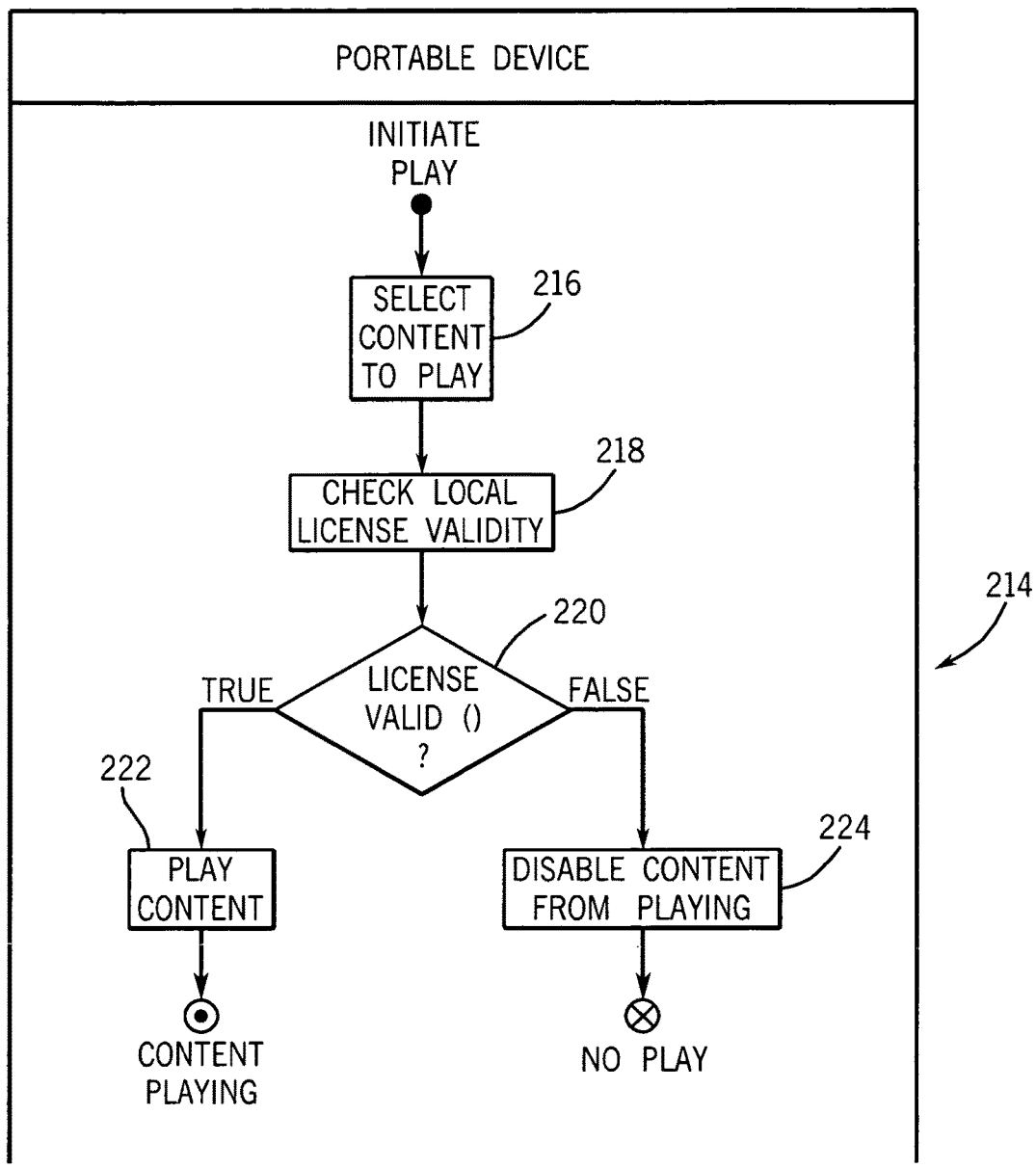
FIG. 7 is a flow chart illustrating exemplary logic in enabling playing of content on a further licensed device in accordance with the present technique.

FIG. 7 illustrates logic similar to that of FIG. 6 for playing content on a non-networked device. The device play activity, designated generally by reference 214, begins with the user selecting content to be played as indicated at step 216. Again, this may be done in any of a wide range of ways, depending upon the type of device, the interface in use on the device, the application software used to initiate the play, and so forth. At step 218, the application verifies whether a valid local license is available. This will typically be done by verifying a local license registry if one exists on the device. If a valid local license is located, in the query performed at step 220, the content is permitted to be played, as indicated by step 222. On the other hand, if no valid local license is found, the content may be disabled from being played, as indicated at step 224.

A particularly interesting feature that may be included in systems designed in accordance with the present technique is the ability to store information relating to content, user, device and other rights managed by the content provider in conjunction with the client application. In a currently contemplated implementation, the rights may be archived on the content provider side in one or more locations, databases, or data structures generally referred to as a "locker". In essence, the locker allows for users to request the content provider to store, or the content provider may on its own initiative store records of the rights that would permit the user to re-access and even re-download content where content has been corrupted, lost or is otherwise needed by the user. Such services may be provided on a standard basis by the content provider, or may be part of an enhanced or premium package of services offered by the provider.

Figure 8:
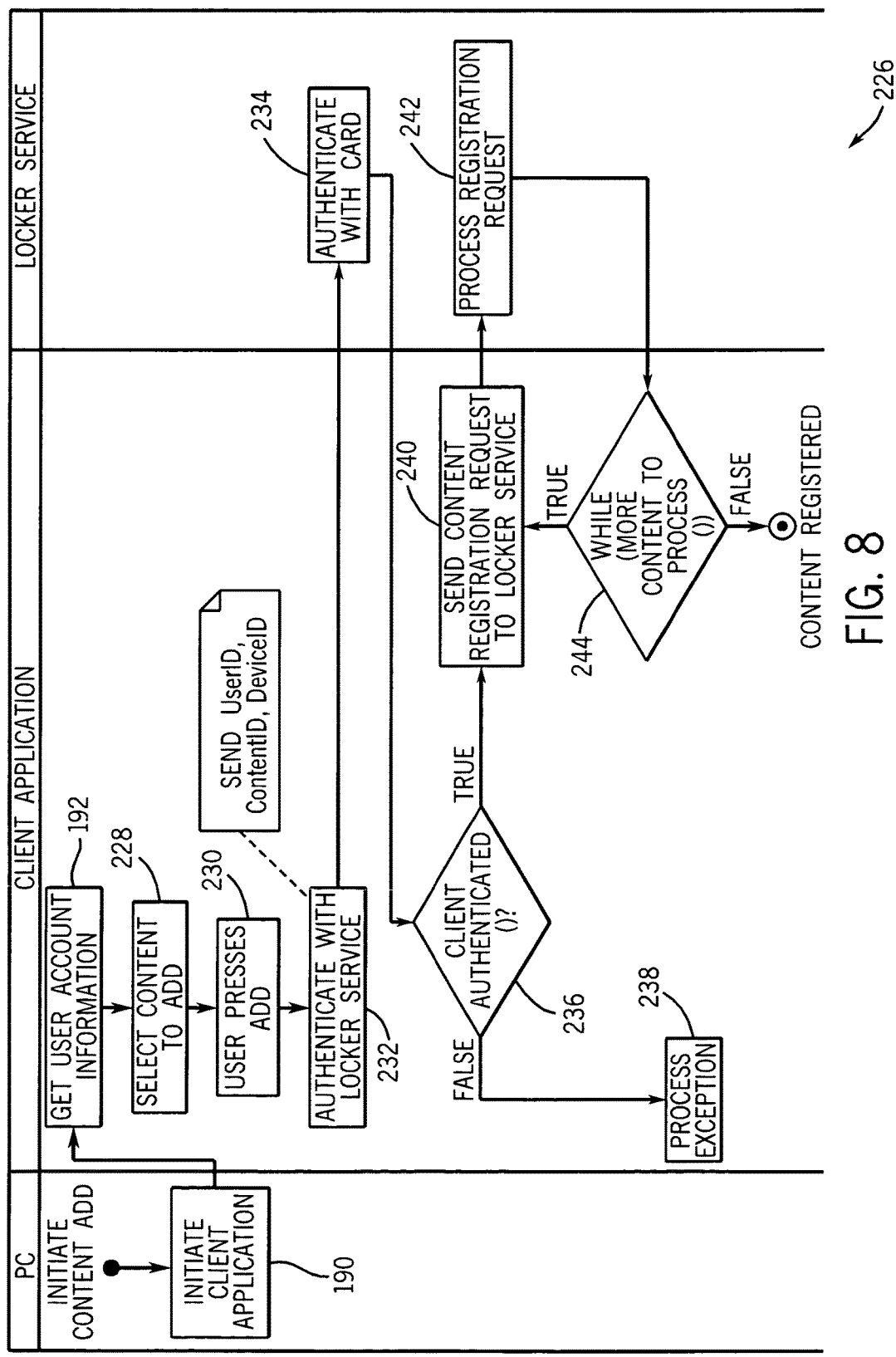
FIG. 8 is a flow chart illustrating exemplary logic in adding rights to a locker in accordance with aspects of the present invention.
Figure 9:
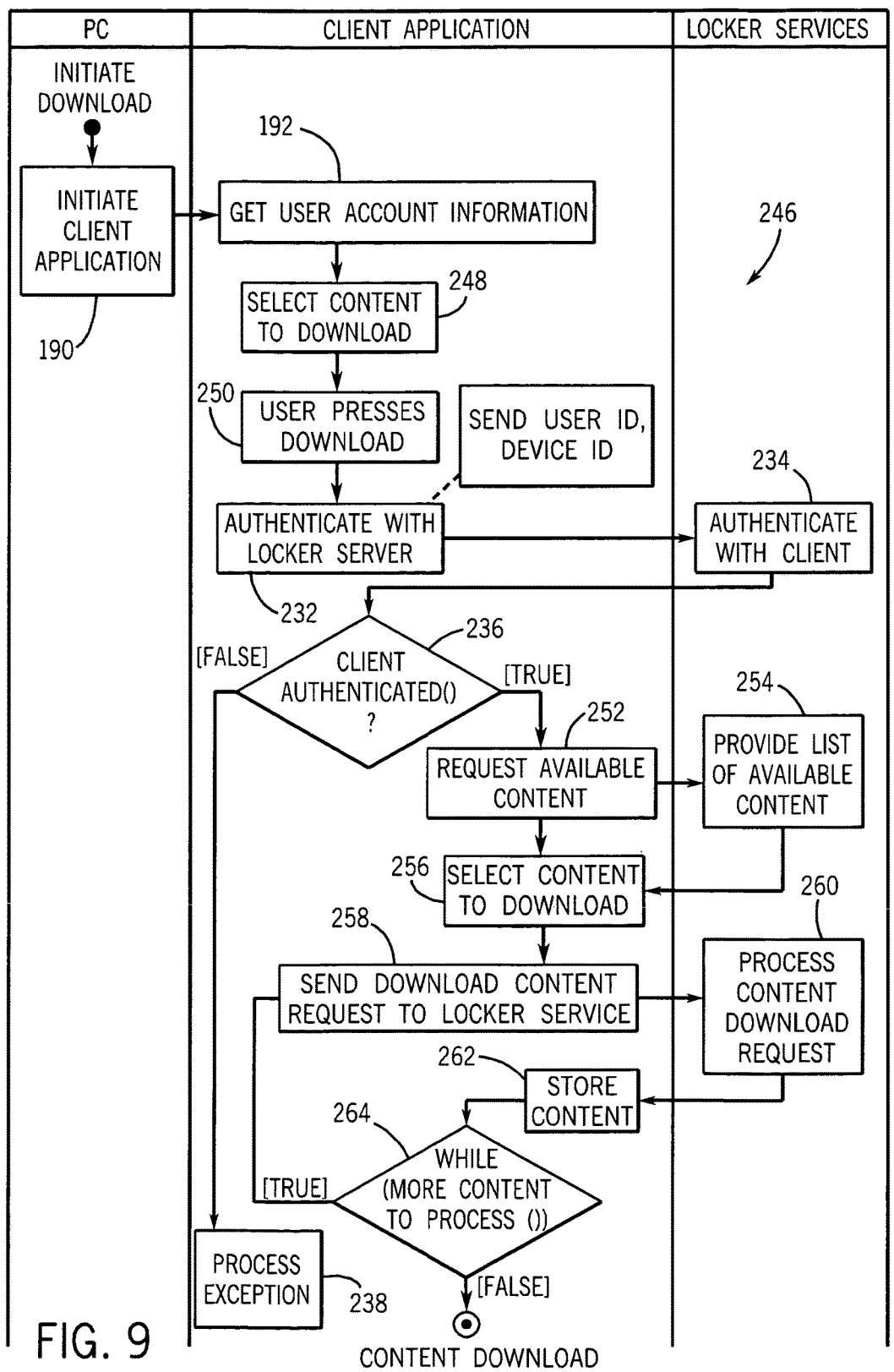
FIG. 9 is a flow chart illustrating exemplary steps in downloading data relating to licensed content and license rights from a locker following the process of FIG. 8.

FIG. 8 illustrates exemplary steps in logic for adding content to such a locker, while FIG. 9 represents exemplary steps in logic for downloading content based upon reference to rights archived in a locker. As indicated in FIG. 8, the loading of content to a locker, as indicated generally by reference numeral 226, begins at step 190 where the client application is initiated as noted in other examples discussed above. The client application then obtains the user account information at step 192, which again may include the user identification, any authentication information required, and so forth. The user may then select content to be added to the locker, as indicated at step 228. This typically will be done by navigating through a listing of the content to which the user or devices have rights. The user then selects to add the content as indicated at step 230. At step 232 an authentication process may be initiated in which the rights of the user to add content to a locker are verified. This may include, for example, collecting and sending user identification information, content identification information, and device identification information for verification of license rights.

At step 234, then, the locker service, which may be part of a software package operative on the content provider side server, receives and recognizes the information transmitted by the client application, and authenticates the contact exchange with the client device. At step 236, the client application determines whether the client has been authenticated by the locker service. If not, a process exception is handled and such notice is provided to the user. If the rights authentication was successful, a content registration request may be sent to the locker service as indicated at step 240. The request is processed by the locker service as indicated at step 242, and the locker service then returns to the client application where a while loop is initiated to proceed through any other registration request that the client may wish to make. Once all such requests have been exhausted as indicated by the query at step 244, the locker loading logic ends.

Essentially, the rights to the content that may be exercised by a user and/or specific devices are stored to permit the user to re-access and even re-load the content when desired. As will be appreciated by those skilled in the art, in practice, the entire content itself may not necessarily be loaded in the locker service, but the locker service may update a database or data structure that contains the information and cross-references the information to content stored in a data repository of the content provider.

FIG. 9 illustrates exemplary logic in accessing or downloading content based upon information stored in the locker. The downloading operation, indicated generally by reference numeral 246, begins again with initiation of the client application at step 190, and accessing the user account information at step 192. Again, and as noted above, the user may perform these acts, for example, when content has been corrupted or otherwise lost, but is again desired for playing. Because the user will already have obtained rights, and these rights will have been stored in the locker, the user may select content to download at step 248, and execute the download by depressing an actual or virtual button, or other interface device at step 250. At step 232 in FIG. 9, which is essentially identical to step 232 in FIG. 8, the locker service is authenticated by sending information to the locker service from the client application, and an authentication step 234 follows, essentially identical to that described above with reference to FIG. 8. If the authentication is successful, as determined at query 236, then, the user may request available content based upon the records in the locker as indicated at step 252. In a present implementation, then, the locker service provides a list of available content from the locker as indicated at step 254. Alternatively, it may be possible to provide a locker listing on the client side enabling the client to simply select content stored in the locker without accessing such a list from the locker service. However, it may generally be preferable to at least verify this list with the listing in the locker service.

At step 256, then, the user may select content to download, and send a download request to the locker service as indicated at step 258. Based upon the request, then, the locker service processes the content download request and, if allowed, sends the licensed content to the user, typically from one or more of the data repositories on the content provider side. The content is then stored on the client side as indicated at step 262. A while loop may then be initiated as indicated at step 264 to allow for other content to be requested from the locker service. When no more content is to be downloaded from the locker service, the logic exits.

It should be noted that the logic of FIG. 9 may be supplemented with imposition of the 3-copy (or multi-copy) rules. That is, prior to the allowed download of the requested content from the locker service, such as following step 260 in FIG. 9, the locker service or another service on the content provider side, may verify that downloading the requested content, although permitted, might cause the system to move out of compliance with the 3-copy rules, and the re-provision of the content may be denied.

Figure 10:
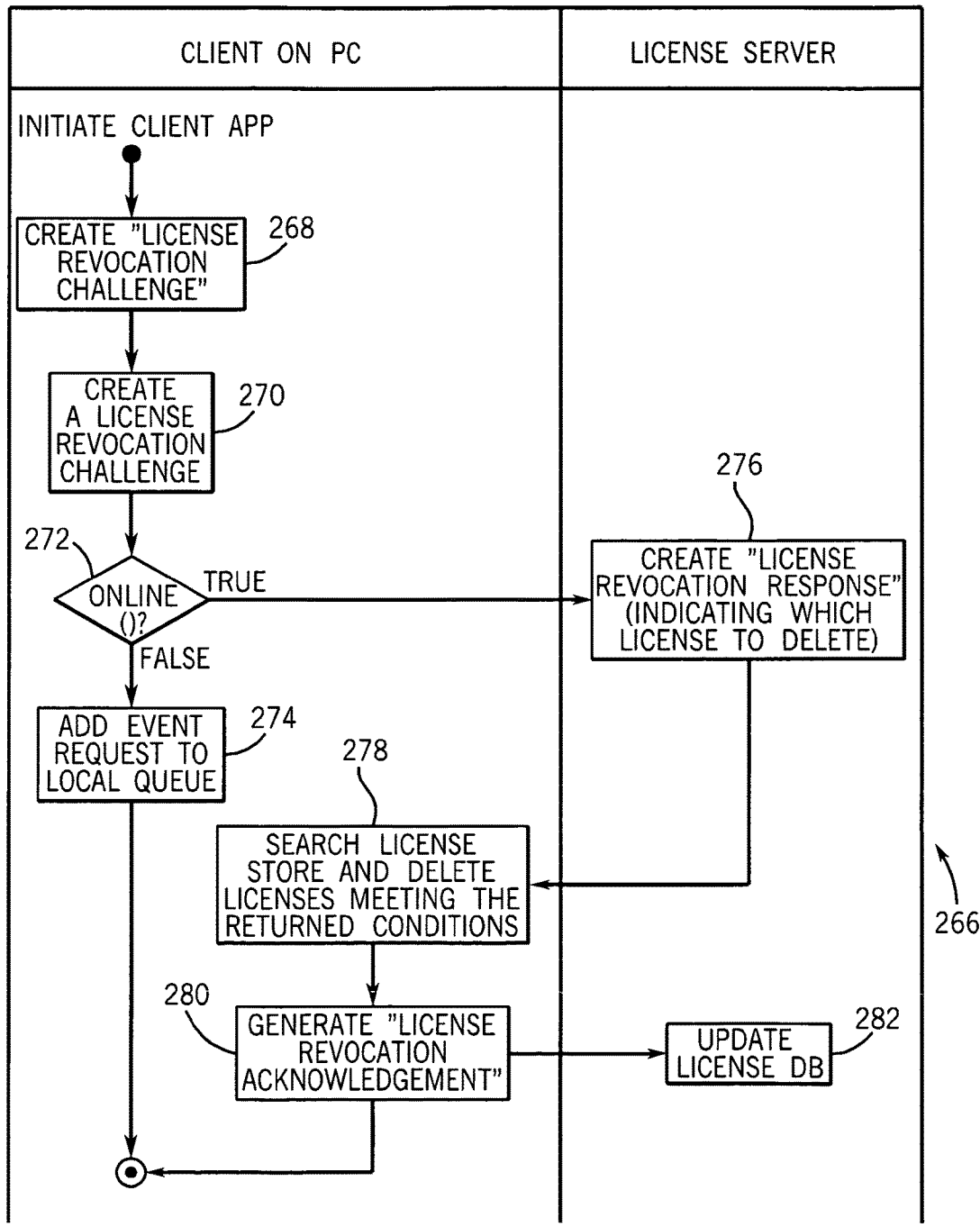
FIG. 10 is a flow chart illustrating exemplary logic in removing targeted device licenses.

FIG. 10 illustrates exemplary logic for removing a device or copy license, such as to permit licensed content to be loaded on additional devices. As noted above, this may be the result of a float copy having been permitted on a device, which would need to be removed to comply with the 3-copy (or multi-copy) rules. The license removal process, designated generally by reference numeral 266, begins with the client or user creating a license revocation challenge locally as indicated at step 268. In general, such events will identify the device, the user, a transaction, and may also identify a content provider's public key, as well as particular licenses to be revoked. At step 270 the actual revocation challenge is created, and at step 272 it is determined whether the device is currently on-line. If the device is not currently on-line, the license revocation is added to the local queue, referred to above in FIG. 3 by reference numeral 94. The license revocation would then be processed in accordance with the following logic the next time the device is on-line.

If the device is currently on-line, the license server creates a license revocation response indicating which licenses to delete as indicated at step 276. The response is then transmitted to the client or user system which then searches for licenses from the license registry to be deleted. In a presently contemplated embodiment, a license revocation acknowledgement message will be generated at step 280, and transmitted to the license server which will confirm the license revocation by updating the license database maintained by the content provider.

Figure 11:
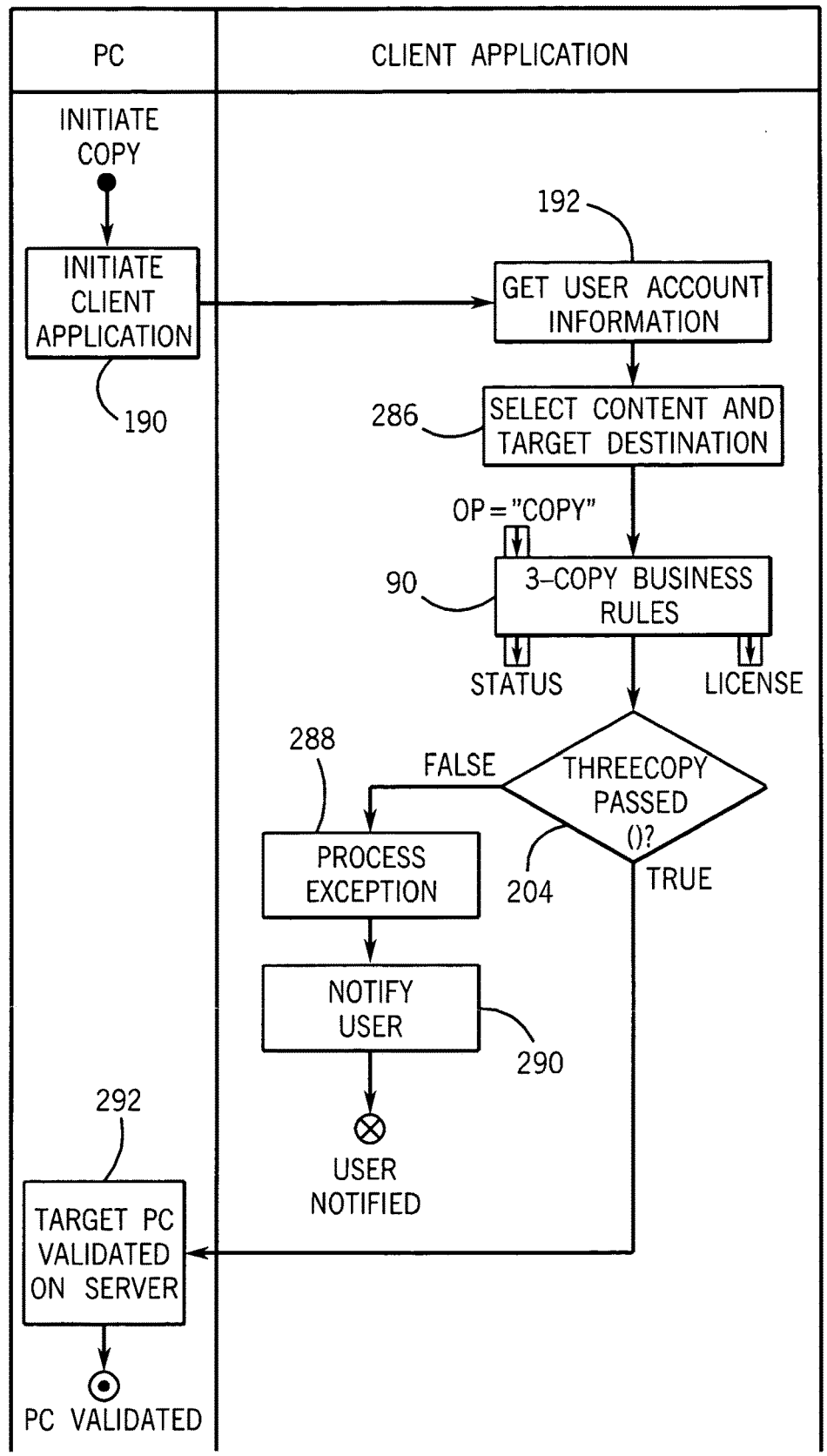
FIG. 11 is a flow chart illustrating exemplary logic in permitting copying of content in accordance with the scheme of FIG. 3.
Figure 12:
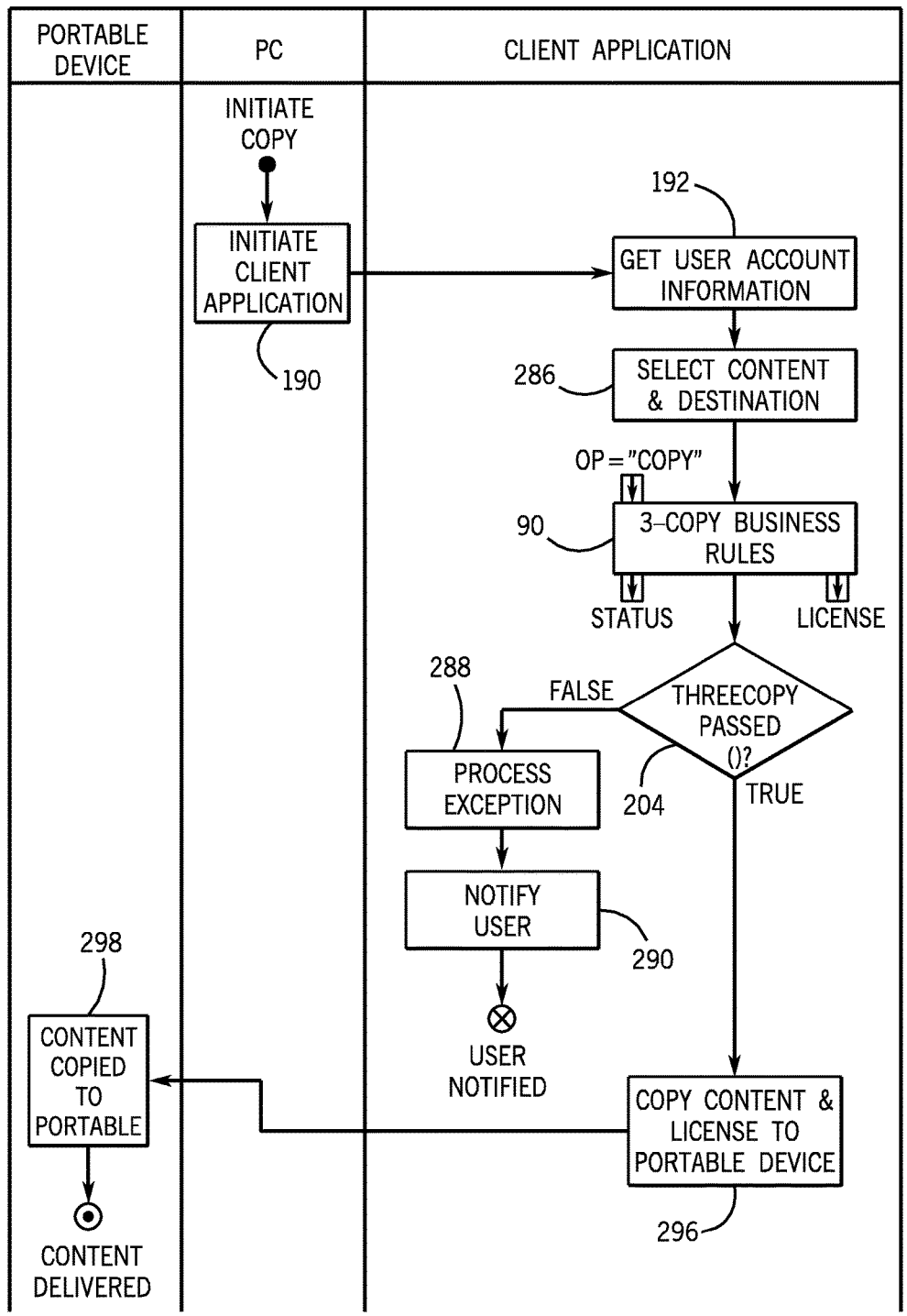
FIG. 12 is a flow chart illustrating exemplary logic in similar copying, but to a portable device.

A number of other operations may be performed by the user based upon a received content, for example, FIGS. 11 and 12 summarize copy operations for generating copies in accordance with the logic set forth in FIG. 3 above. The copy operation summarized in FIG. 11, designated generally by reference numeral 284, begins again with initiating the client application at step 190, and with obtaining the user account information at step 192. At step 286, the user would select particular content to copy, as well as a target destination (e.g., a device). The copy operation is then subject to the 3-copy (or multi-copy) rules implemented by the logic of FIG. 3. The copy operation will be permitted as noted above, so long as the total number of active copies does not exceed the number allowed by the DRM logic. At step 204, then, as with previous operations, the logic determines whether the allowed number of copies simultaneously active or used by the licensed user has been exceeded or would be exceeded by the requested copy operation. If the number would be exceeded, the processing proceeds to step 288 where an exception is noted and a notice is given to the user as indicated at step 290. If the maximum number of simultaneous copies has not been exceeded, the copy operation is allowed to proceed, the targeted device is validated on the server and the copy operation may go forward, as indicated at step 292 in FIG. 11.

Similarly, content may be copied to other devices, including portable devices as summarized in FIG. 12. The steps of FIG. 12 for copying to a portable device, designated generally by the reference numeral 294, generally proceed as outlined in FIG. 11, with content and destination being specified, the copy rules being applied, and eventually terminating, if successful, in copying of content to the portable device at step 296, and storage of the content on the portable device at step 298.

Figure 13:
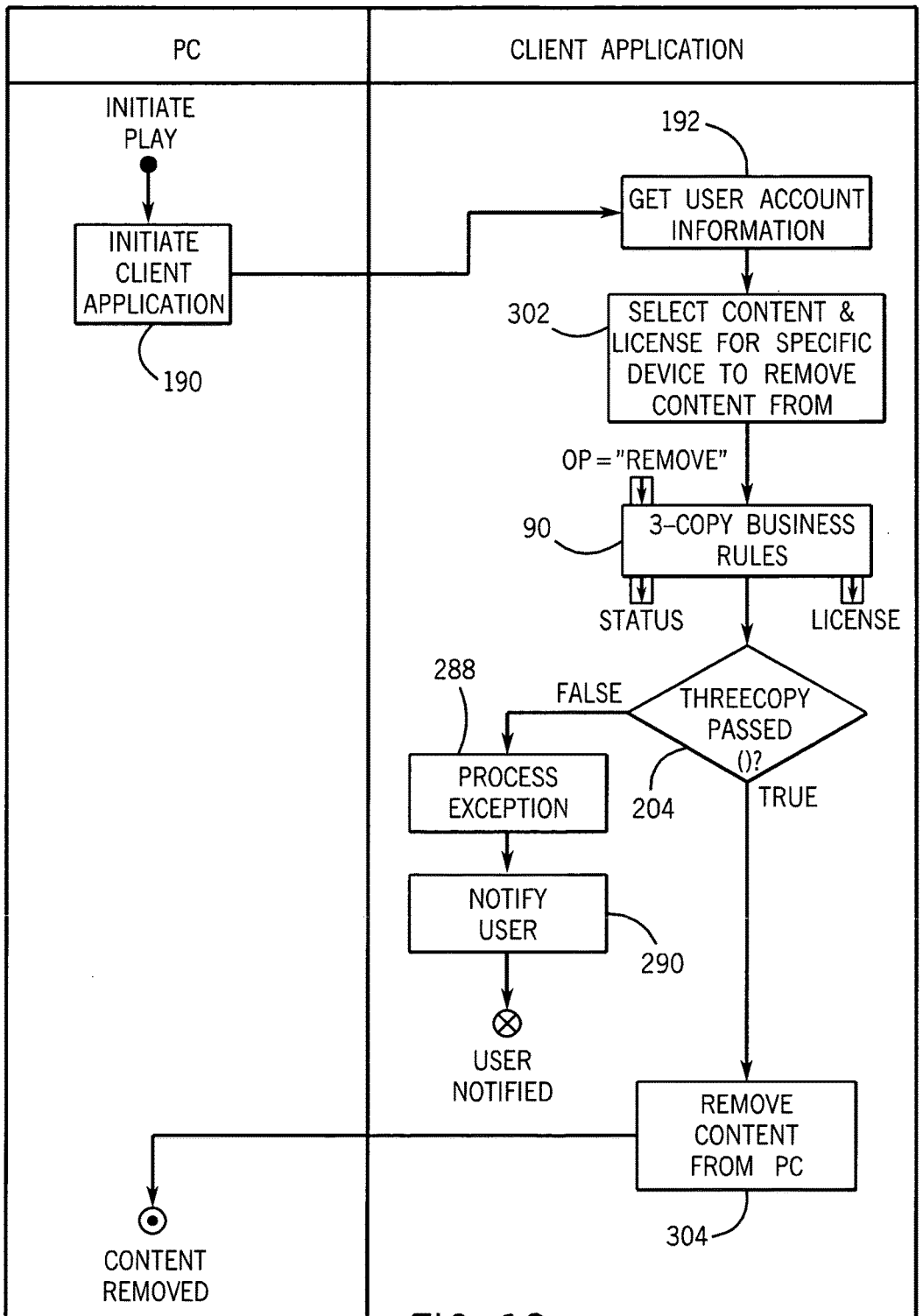
FIG. 13 is a flow chart illustrating exemplary logic in removing content from a device consistent with the scheme of FIG. 3.
Figure 14:
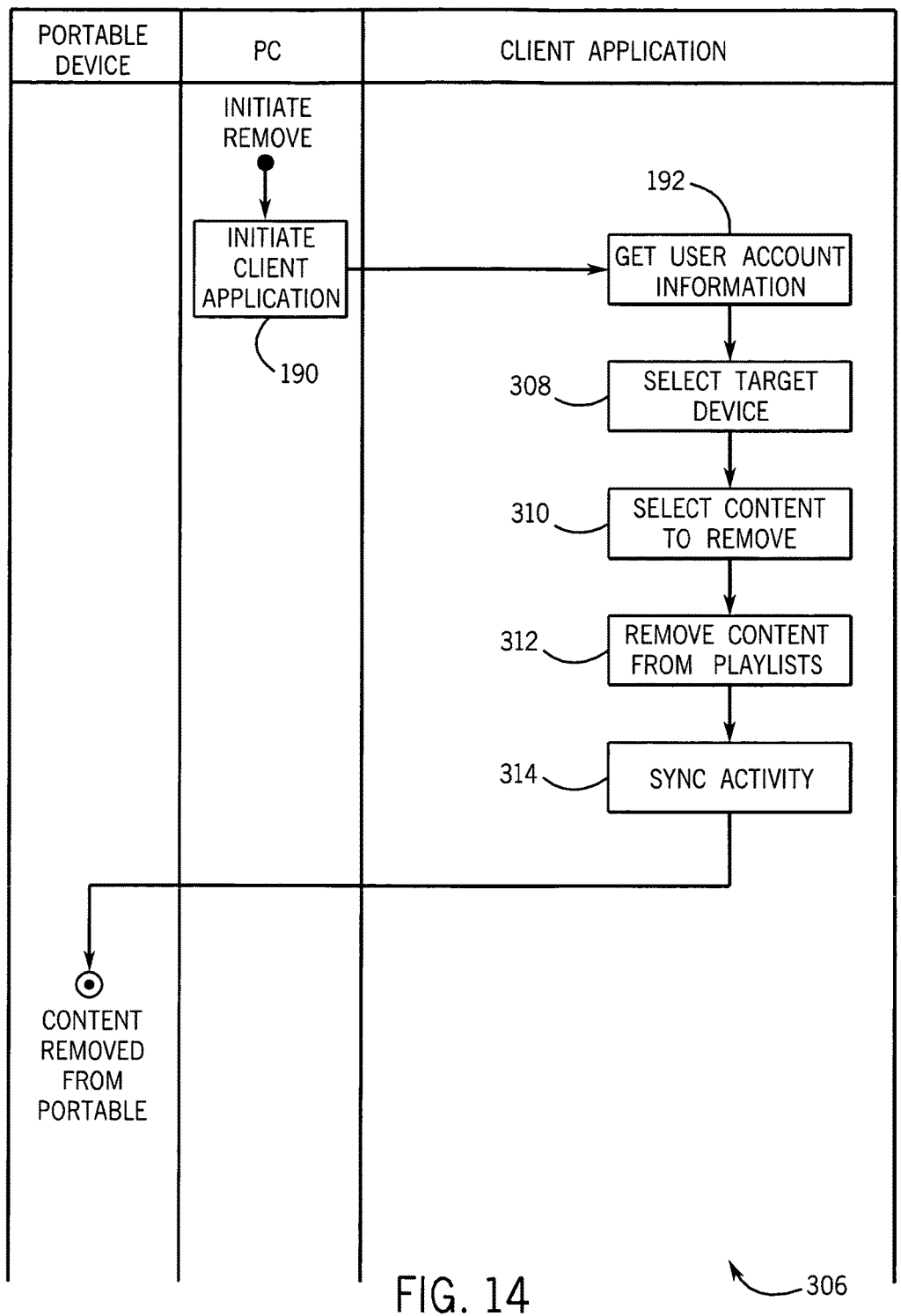
FIG. 14 is a flow chart illustrating exemplary logic involved in removing content from a portable device.

Conversely, content may be removed from one or more devices as summarized in FIGS. 13 and 14. Removal of content from a device as indicated by reference numeral 300 begins again with initiating the client application at step 190, and obtaining information on the account at step 192. At step 302, then, the user would select content and an associated license for a specific device from which the content is to be removed. The logic then proceeds to the 3-copy (or multi-copy) rules 90 as summarized in FIG. 3 above. As with the copy operation, if the rules implemented by the DRM logic are not passed, the operation fails, and an exception is processed and notification is given to the user as indicated by steps 288 and 290. If the operation is permitted, the content is removed from the target device as indicated by step 304. The removal from the device may include updating of any applicable play lists, license registries kept local to the application, and so forth. In all of these operations, where the device is currently on-line, the registry maintained by the content provider is also synchronized with the local registry.

FIG. 14 represents exemplary logic for removal of content from a portable device, as indicated generally by reference numeral 306. Again, the logic begins with initiation of the client application at step 190 and obtaining the account information at step 192. At step 308, in the application, the user would select a target device, and at step 310 select content to be removed from the device. At step 312, then, play lists and similar summaries or indices may be updated accordingly. At step 314, a synchronization event is initiated to ensure that the license registry maintained by the content provider is updated to remain consistent with the local registry. That is, the number of total copies would be decremented to reflect that the content has been removed from the portable device. This synchronization activity will occur immediately if the device on which the client application is executed is on-line, or subsequently during a later synchronization session if the device is not currently on-line.

Figure 15:
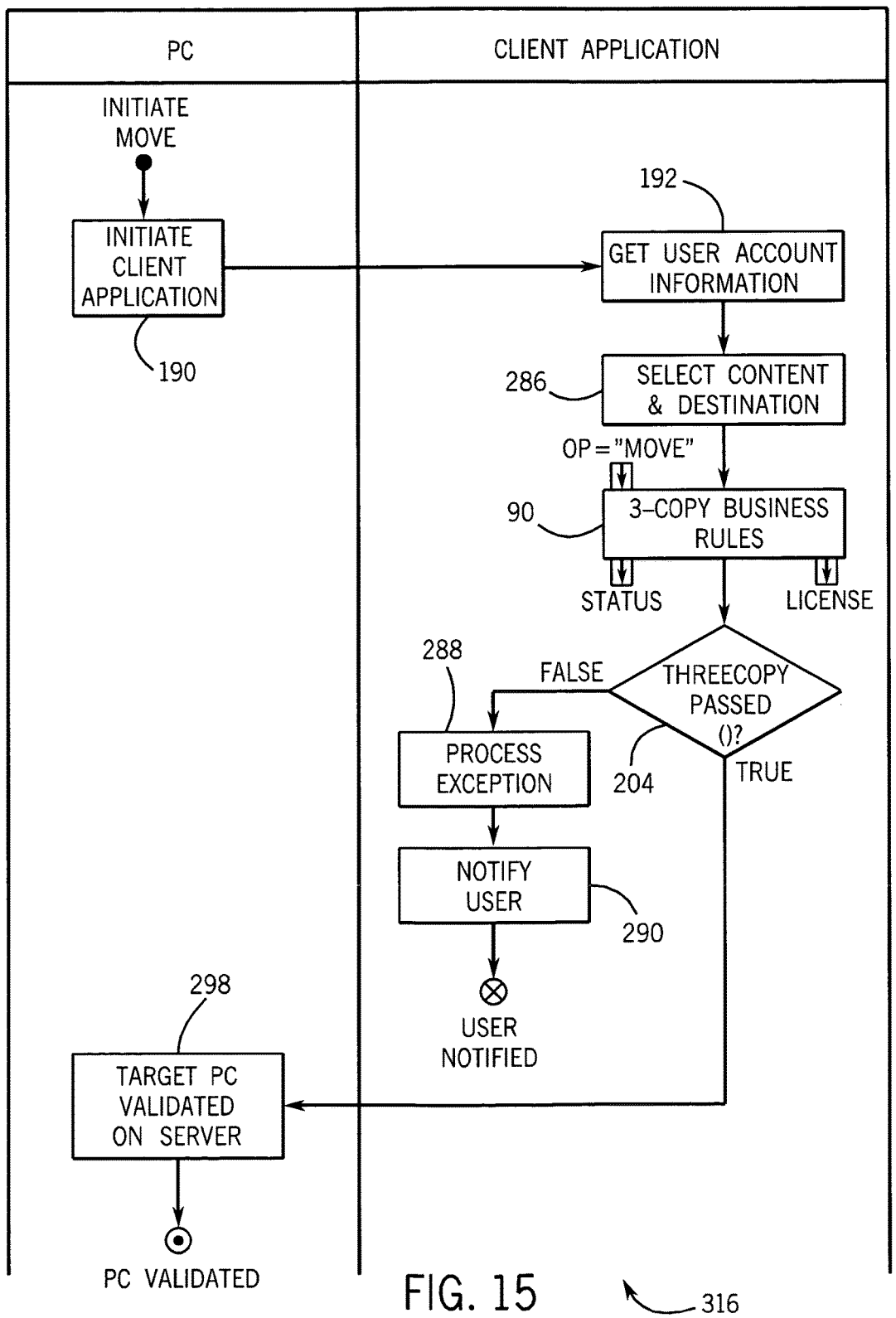
FIG. 15 is a flow chart illustrating exemplary logic in moving content between licensed devices.
Figure 16:
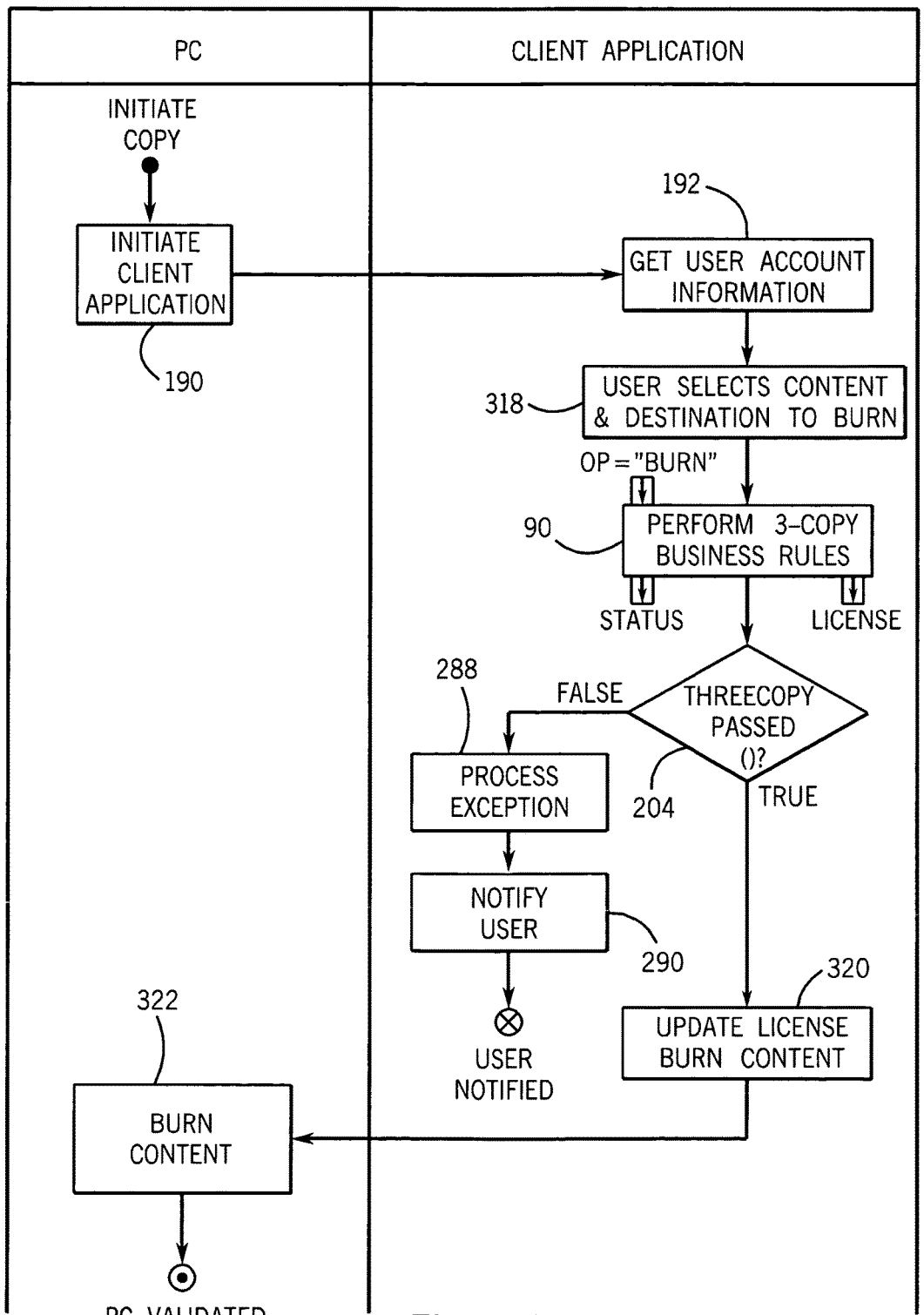
FIG. 16 is a flow chart illustrating exemplary logic in "burning" or creating a hardcopy of content, such as on a compact disc or digital video disc.
Figure 17:
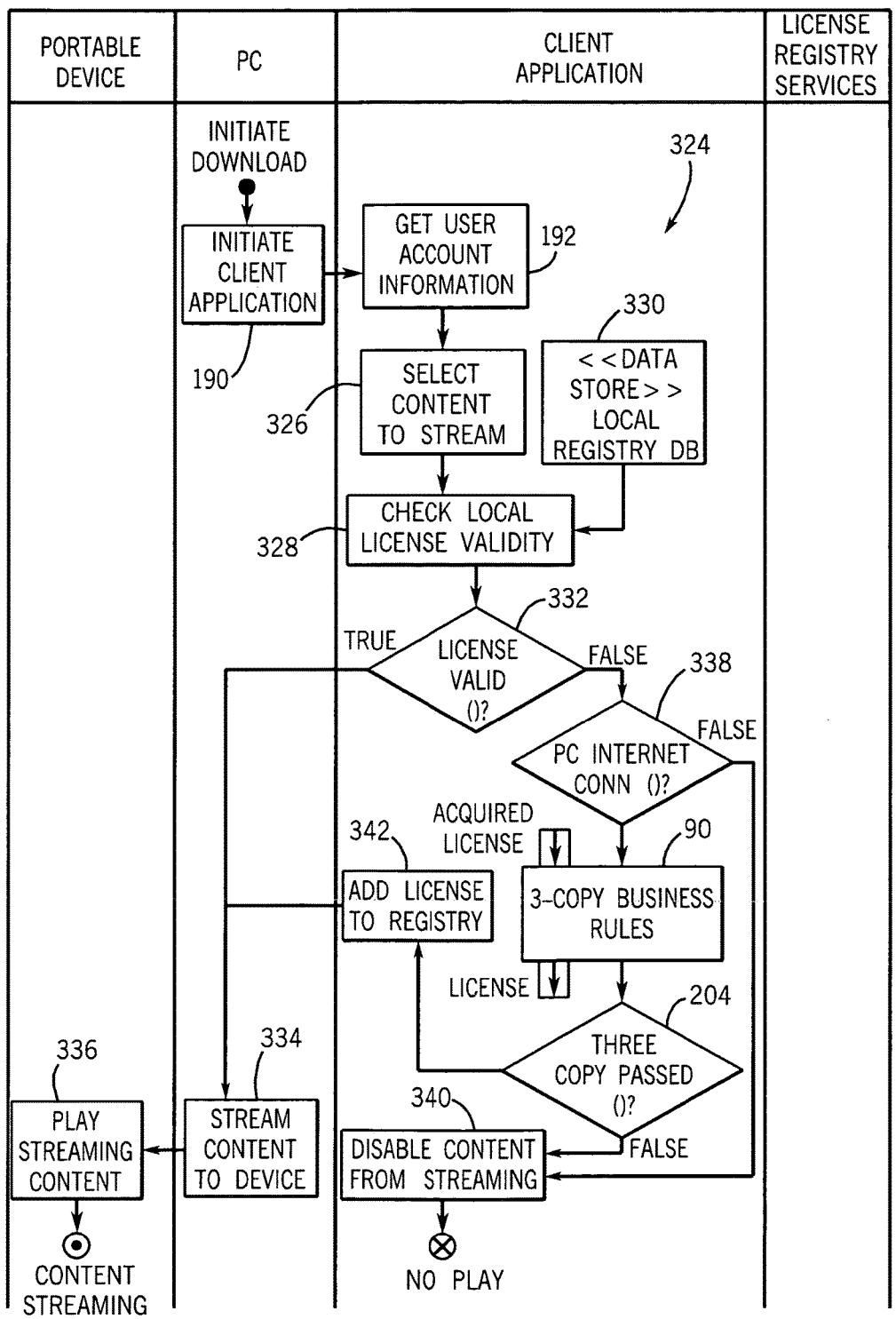
FIG. 17 is a flow chart illustrating exemplary logic for streaming content from one device to another in accordance with aspects of the present technique.

As noted above in the discussion of FIG. 3, other operations may be performed based upon the present DRM scheme. FIG. 15, for example, illustrates exemplary logic for moving content from one device to another. The move logic, designated generally by reference numeral 316, begins again with initiation of the client application at step 190 and obtaining the user account information at step 192. As in previous activities, the user would then select content to be moved and a target destination as indicated at reference numeral 286. The 3-copy (or multi-copy) rules are then implemented as indicated at step 90. If the move does not comply with the rules summarized in FIG. 3, an exception is processed at step 288 and notification is given to the user at step 290. The move operation is thus disallowed. If the move does comply with the DRM scheme outlined in FIG. 3, as determined at block 204, the target device is validated on the server as indicated at step 298, and the content may be moved from one device to another. Again, the steps executed in block 90 will include updating of the local license registry and synchronizing this registry with that maintained by the content provider if the device is currently on-line. Otherwise, the registries will be synchronized at the next opportunity.

Another activity allowed by the present DRM scheme is burning of content onto CD's, DVD's, and other media. Exemplary logic for this operation is outlined in FIG. 16, and designated generally by reference numeral 316. As with the other activities, the burning operation begins with initiation of the client application at step 190, and obtaining the user account information at step 192. At step 318, then, the user selects content to be stored on the tangible media in the "burn" operation, and the destination of a device used to burn the content onto the media. The 3-copy (or multi-copy) rules are then executed as indicated by reference numeral 90. As noted above, in general, in a present embodiment such burn operations are limited to a single burn, although other numbers of burns may be permitted. This parameter, too, may be alterable by the content provider, rendering the present technique adaptable to the specific business model of the content provider. As also noted above, in a present implementation, such burns are permitted only while the user device is on-line. Other approaches may, of course, be implemented, in which burns are permitted while the user is not on-line. Following implementation of the rules of FIG. 3, it is determined whether the burn operation is permitted, as indicated by decision block 204, and if not a process exception is noted at step 288, and notification is provided to the user at step 290. If the burn is permitted, the license burn count is updated at step 320, and the burning operation may proceed, storing the information on the target media, as indicated at step 322.

In addition to playing content as described above, the present implementation of the DRM scheme allows for streaming content from one device to another. Exemplary logic for this type of operation is summarized in FIG. 17, and indicated generally by reference numeral 324. Such logic may be used, for example, in streaming media from a media center or computer to a portable device, television, or other viewing station. The logic begins again at step 190 where the client application is initiated, and user account information is obtained at step 192. The user will then select content to stream at step 326, and the local license registry is verified at step 328 to determine whether the user has the right to stream the media to the target device. This verification is, of course, performed based upon the local license registry, as indicated generally by block 330.

If a license is found for the target device, then, as determined at step 332, the streaming operation may begin as indicated at step 334. As will be appreciated by those skilled in the art, such operations generally rely upon playing of the content on one device, such as the originating computer, and transmitting in real time or near-real time data that can be reconstructed into images, sound, and so forth on the target device. The streaming content is then played on the target device as indicated at step 336 in FIG. 17.

If no valid license is identified locally at step 332, the logic determines whether the device on which the client application is running is currently connected to the network such that the content provider can be contacted, as indicated at step 338. If no such connection is available, and no license exists locally, the logic simply proceeds to step 340 where the streaming operation is disallowed. If, on the other hand, the device is currently connected to a network such that the content provider can be contacted, the 3-copy (or multi-copy) rules are run as indicated at step 90. If the DRM scheme outlined in FIG. 3 above allows the operation, then, a license is added to the registry as indicated at reference numeral 342. In this case, of course, the license is synchronized between the license registry held locally and that maintained by the license registry service of the content provider. Following establishment of such a license, and its recordal, then, the streaming content operation may proceed as described above.

Figure 18:
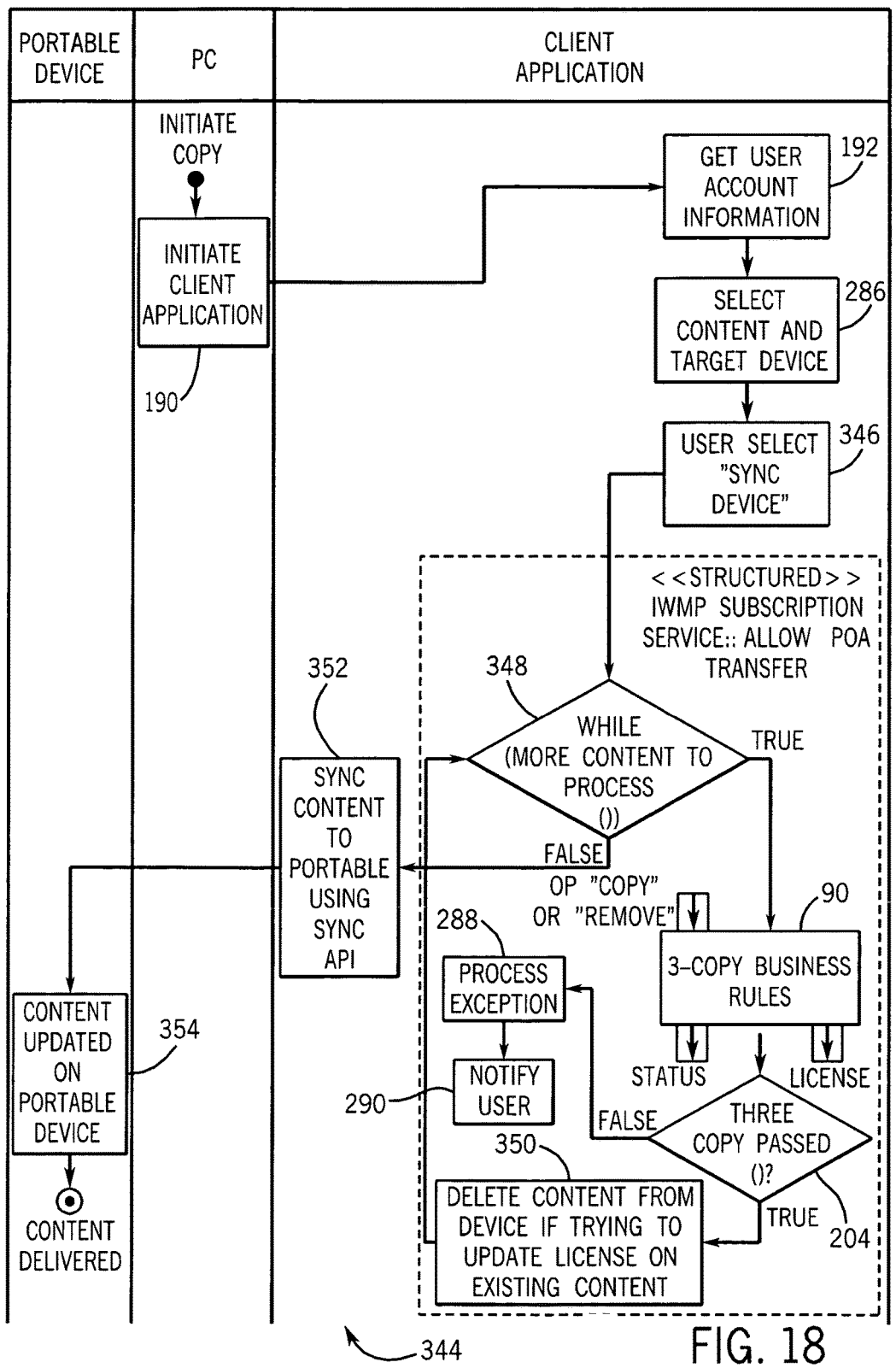
FIG. 18 is a flow chart illustrating exemplary logic in a synchronization ("sync") activity between a computer and a portable device in accordance with aspects of the invention.

A synchronization activity, mentioned above with respect to FIGS. 4 and 5 may sometimes be carried out in accordance with a specific synchronization protocol summarized generally in FIG. 18. The synchronization activity, designated generally by reference numeral 344, begins, as before, with initiation of the client application at step 190, and obtaining the user account information at step 192. At step 286, then, the user may select content and a target device, for which synchronization of license information with the local license registry is desired. At step 346, the user would select to synchronize the device with the client application running on a primary device on which a local license registry is stored. It should be noted that the present DRM scheme permits automatic synchronization, that may be set as a default, or that can be set up by the user for a specific device. In a presently contemplated implementation, this option is device driven.

Local synchronization logic is then executed. This logic begins with a while loop 348 being initiated for processing through what may be a series of synchronization operations. The 3-copy (or multi-copy) rules are then run as indicated at step 90, to ensure that the limits on copying, floats and so forth are respected. If the scheme allows for the synchronization, the logic proceeds to step 350 where content may be deleted from a device if the user is attempting to update a license on existing content. Because the operations summarized in FIG. 18 may be performed off-line, these operations allow for "clean up" of the locations of specific content, consistent with the licenses stored in the local license registry. The while loop initiated at block 348 then continues until all selected content and target devices are synchronized.

Following synchronization of the license registry through the while loop initiated at block 348, content is then synchronized to other devices, such as portable devices via a program interface, as indicated at reference numeral 352. Consequently, the content is updated on the portable device as indicated at step 354, which may include loading, unloading, or otherwise altering the data on the portable or other device.

Figure 19:
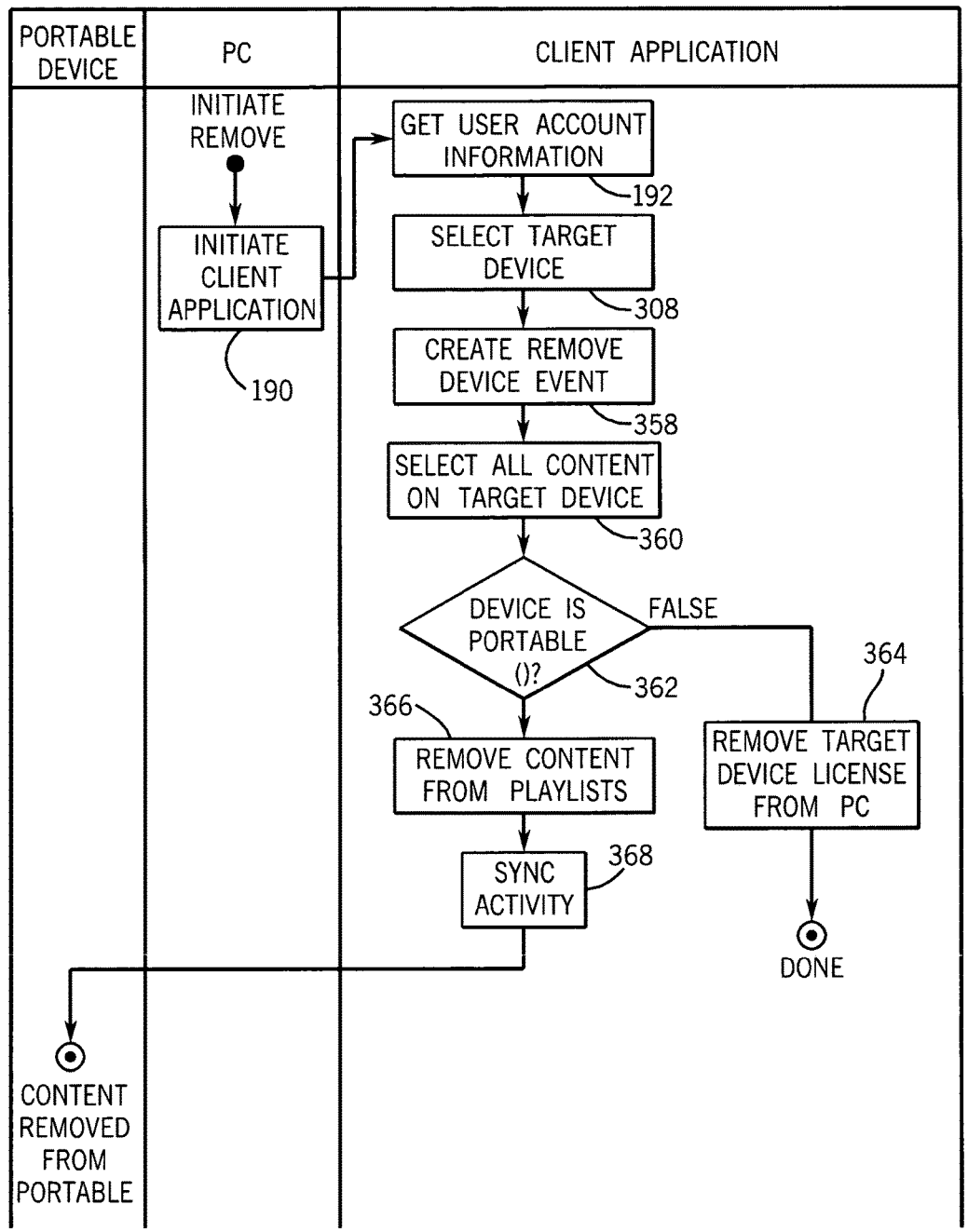
FIG. 19 is a flow chart illustrating exemplary logic involved in disabling a device, such as a computer or portable device in accordance with aspects of the invention.

Similarly, a primary or portable device may be disabled to disallow playing of content as summarized in FIG. 19. This disabling operation, designated generally by reference numeral 356, will again include initiation of the client application at step 190 and obtaining of the user account information at step 192. At step 308, the user will again select the target device to be disabled. At step 358, then, a removed device event is created. Such events, and indeed the overall logic summarized in FIG. 19 may be used to remove the ability to acquire licenses for or play content on certain devices, such as if a device is discarded, sold, or otherwise disposed of. Based upon the event created at step 358, then, all content on the device is selected at step 360, and is determined whether the device is portable at step 362. That is, the same logic 356 may be used to disable a portable or other secondary device, or the primary device on which the content is stored and played. In the latter case, the logic would proceed to step 364 where the target device license would be removed from the primary device. On the contrary, if the device to be disabled is a portable or secondary device, content play lists are removed from the primary device on which the client application is run, as indicated at step 366, and a sync activity is initiated as indicated at step 368. This activity may generally be performed in accordance with the logic summarized above with respect to FIG. 18.

Figure 20:
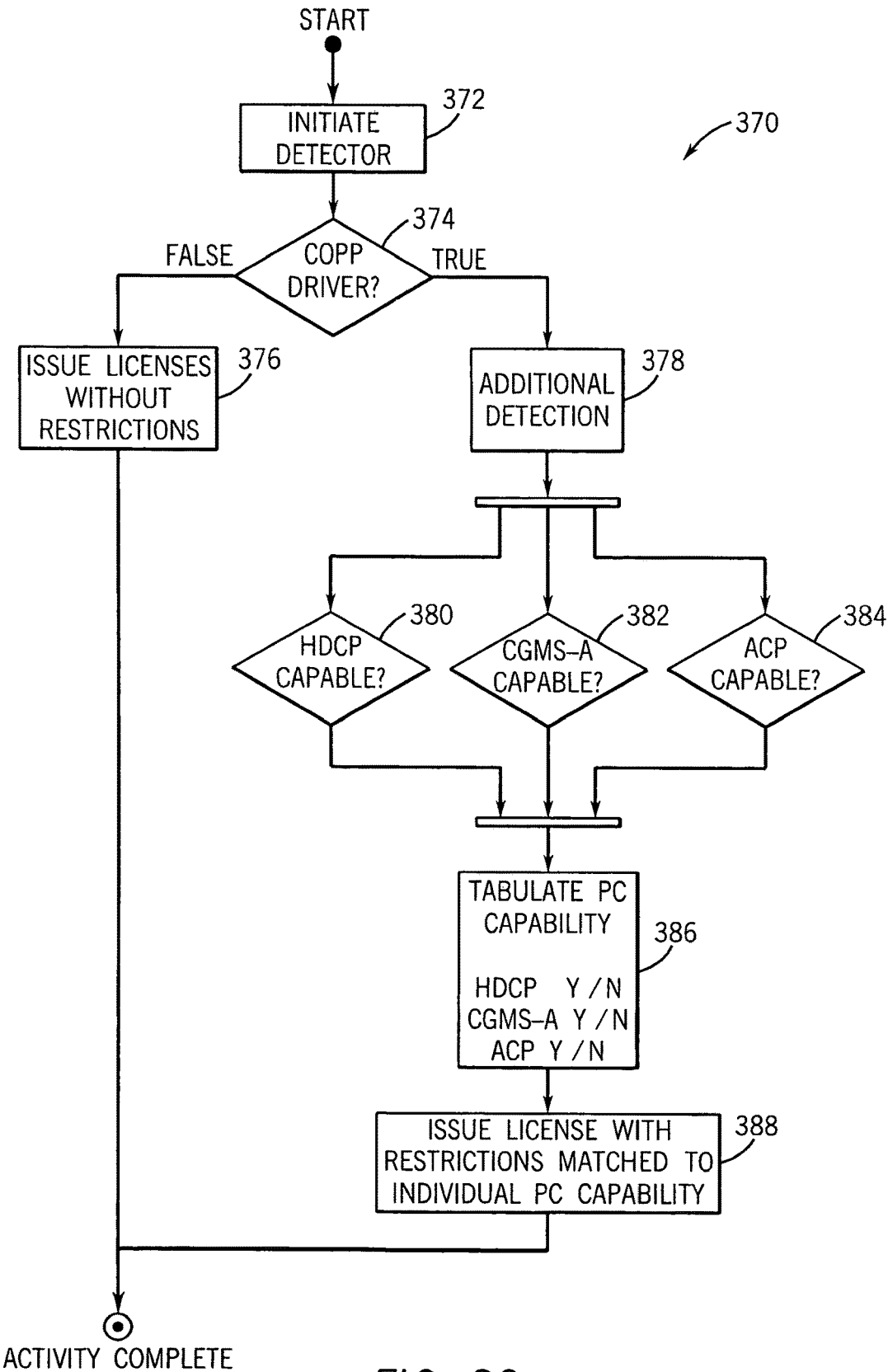
FIG. 20 is a flow chart illustrating exemplary logic for allowing the present scheme to comply with various format standards, such as high definition video standards.

As noted above, the present DRM scheme may permit regulation of activities with respect to specific content to conform to industry standards, such as the certified output protection protocol or COPP. FIG. 20 illustrates exemplary logic that may be implemented by the scheme for accomplishing such control. In general, the scheme queries the machine capability to issue licenses based upon such capabilities. In a present implementation, the process as indicated generally by reference 370, may begin with calling of a tool capable of detecting the presence of a COPP driver, as indicated generally at reference numeral 372. If a COPP driver is not identified on the device, as resulting from the query indicated at reference numeral 374, licenses may be issued as described above without restrictions, as indicated at reference numeral 376. If the COPP driver is detected, additional querying of the device capabilities may be performed as indicated at reference numeral 378. Such detection may identify, for example, whether the target device is capable of operating in accordance with several industry standard protocols, such as the high-bandwidth digital content protection (HDCP) protocol, the copy generation management system analog (CGMS-A) protocol, or the analog copy protection (ACP) protocol. The process may thus determine whether any of these protocols are enabled by the device as indicated generally by blocks 380, 382 and 384 in FIG. 20. Based upon the device capabilities, then, a tabulation may be made of these capabilities as indicated at step 386, and licenses may be issued with restrictions that match the individual device capability, as indicated generally at step 388.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of enforcing a DRM scheme via execution of a client application stored in a memory of a first device and executed by a processor of the first device, the method comprising:

receiving, via the processor, a request for creation of a first copy of the digital content on a second device while the first device is not on-line with a license server;

determining, via the processor, a number of non-float licenses of the digital content allowed by the DRM scheme;

determining, via the processor, a number of active licensed non-float copies of the digital content from a local license registry in the memory of the first device;

at a first time, when the number of non-float licenses allowed by the DRM scheme is equal to or less than the number of active licensed non-float copies:

determining a third device comprising a target copy of the active licensed non-float copies of the digital content;

transferring, via the processor, the digital content to the second device to create the first copy of the digital content on the second device, even though creation of the first copy exceeds the number of non-float licenses allowed by the DRM scheme;

granting, in the local license registry, a non-float license for the digital content to the second device that is relinquished from the third device; and granting, in the local license registry, a temporary float license for the digital content to the third device to use until the first device is on-line with the license server; and at a second time, when the first device is on-line with the license server after creating the first copy of the digital content on the second device: removing or disabling the temporary float license in the local license registry.

2. The method of claim 1, comprising providing the digital content to the first device by a network link to a remote content provider.

3. The method of claim 1, wherein the first copy of the digital content is created on the second device only when the number of number of non-float licenses of the digital content allowed by the DRM scheme is equal to or greater than 1.

4. The method of claim 1, wherein the first copy of the digital content is created on the second device only when a predetermined number of allowable active temporary float licenses is not exceeded.

5. The method of claim 4, wherein the number of allowable active temporary float licenses is based upon a synchronization performance threshold.

6. The method of claim 1, comprising: at the second time, removing the target copy of the digital content from the third device.

7. The method of claim 1, wherein the temporary float license expires after a predetermined time period.

8. A tangible, non-transitory, machine-readable medium, storing a client application comprising machine-readable instructions that enforce a DRM scheme when executed by a processor of a first device, the machine-readable instructions comprising instructions to:

receive, via the processor, a request for creation of a first copy of the digital content on a second device;

determine, via the processor, a number of non-float licenses of the digital content allowed by the DRM scheme;

determine, via the processor, a number of active licensed non-float copies of the digital content from a local license registry in the memory of the first device;

when the number of non-float licenses allowed by the DRM scheme is greater than the number of active licensed non-float copies: transfer, via the processor, the digital content to the second device to create the first copy of the digital content on the second device in accordance with the DRM scheme; and otherwise, when the number of non-float licenses allowed by the DRM scheme is equal to or less than the number of active licensed non-float copies:

determine a third device comprising a target copy of the active licensed non-float copies of the digital content;

when the first device is on-line with a license server: deny the request until the target copy of the active licensed non-float copies of the digital content is removed or disabled from the target device;

otherwise, when the first device is not on-line with the license server: transfer, via the processor, the digital content to the second device to create the first copy of the digital content on the second device, even though creation of the first copy exceeds the number of non-float licenses allowed by the DRM scheme;

grant, in the local license registry, a non-float license for the digital content to the second device that is relinquished from the third device; and grant, in the local license registry, a temporary float license for the digital content to the third device to use until the first device is on-line with the license server; and remove or disable, via the processor, the target copy of the active licensed non-float copies of the digital content at a point in time when the first device is on-line with the license server after the creation of the first copy of the digital content on the second device.

9. The machine-readable medium of claim 8, wherein, to grant the temporary float license, an event is added to a user side process queue is processed with the license server when the first device is on-line with the license server via a network link.

10. The machine-readable medium of claim 8, comprising instructions to maintain the local license registry, wherein the local license registry is synchronized with the license server when the first device is on-line with the licensing server via a network link.

11. The machine-readable medium of claim 8, wherein the first copy of the digital content is created on the second device only when the number of number of non-float licenses of the digital content allowed by the DRM scheme is equal to or greater than 1.

12. The machine-readable medium of claim 8, wherein the first copy of the digital content is created on the second device only when a predetermined number of temporary float licenses is not exceeded.

13. A computer system for enforcing a DRM scheme, comprising a processor of the computer system executing a client application stored in a memory of the computer system, wherein the computer system is configured to:

receive, via the processor, a request for creation of a first copy of the digital content on a second device;

determine, via the processor, a number of non-float licenses of the digital content allowed by a DRM scheme;

determine, via the processor, a number of active licensed non-float copies of the digital content from a local license registry in the memory of the computer system;

at a first time, when the number of non-float licenses allowed by the DRM scheme is greater than the number of active licensed non-float copies of the digital content: transfer, via the processor, the digital content to the second device to create the first copy of the digital content on the second device in accordance with the DRM scheme;

at a second time, when the number of non-float licenses allowed by the DRM scheme is equal to or less than the number of active licensed non-float copies and the computer system is on-line with a licensing server: deny the request until a target copy of the active licensed non-float copies of the digital content is removed or disabled from a third device; and at a third time, when the number of non-float licenses allowed by the DRM scheme is equal to or less than the number of active licensed non-float copies of the digital content and the computer system is not on-line with the licensing server: transfer, via the processor, the digital content to the second device to create the first copy of the digital content on the second device, even though creation of the first copy exceeds the number of non-float licenses allowed by the DRM scheme;

grant, in the local license registry, a non-float license for the digital content to the second device that is relinquished from the third device; and grant, in the local license registry, a temporary float license for the digital content to the third device to use until the computer system is on-line with the license server; and at a fourth time, when the computer system is on-line with the licensing server after creating the first copy of the digital content on the second device: remove or disable the temporary float license in the local license registry.

14. The computer system of claim 13, wherein the processor is configured to create an event that is added to a user side process queue upon granting the temporary float license of the digital content.

15. The computer system of claim 14, wherein the processor is configured to process the event with the license server when the computer system is on-line with the license server via a network link.

16. The computer system of claim 13, wherein the processor maintains the local license registry, and wherein the local license registry is synchronized with the license server when the computer system is on-line with the license server via a network link.

17. The computer system of claim 13, wherein the first copy of the digital content is created on the second device only when the number of number of non-float licenses allowed by the DRM scheme is equal to or greater than 1.

18. The computer system of claim 13, wherein the first copy of the digital content is created on the second device only when a predetermined number of temporary float licenses is not exceeded.

19. A system for enforcing a DRM scheme, comprising:
a processor of a first device; and
a tangible, non-transitory, machine-readable medium, comprising machine-readable instructions that, when executed by the processor, cause the processor to:

receive a request for creation of a first copy of the digital content on a second device while the first device is not on-line with a license server;

determine a number of non-float licenses of the digital content allowed by the DRM scheme;

determine a number of active licensed non-float copies of the digital content from a local license registry in a memory of the first device;

when the number of non-float licenses allowed by the DRM scheme is greater than the number of active licensed non-float copies: transferring, via the processor, the digital content to the second device to create the first copy of the digital content on the second device in accordance with the DRM scheme; and when the number of non-float licenses allowed by the DRM scheme is equal to or less than the number of active licensed non-float copies:
  determine a third device comprising a target copy of the active licensed non-float copies of the digital content;
  when the first device is on-line with a license server:
    deny the request until the target copy of the active licensed non-float copies of the digital content is removed or disabled from the third device;
  otherwise, when the target device is not on-line with the license server:
    transfer, via the processor, the digital content to the second device to create the first copy of the digital content on the second device, even though creation of the first copy exceeds the number of non-float licenses allowed by the DRM scheme;
    grant, in the local license registry, a non-float license for the digital content to the second device that is relinquished from the third device; and
    grant, in the local license registry, a temporary float license for the digital content to the third device to use until the first device is on-line with the license server; and
    remove or disable the temporary float license in the local registry when the first device is on-line with the license server after creating the first copy.

20. The system of claim 19, comprising a network link configured to communicatively couple the system to the license server.

21. The system of claim 19, wherein the system is configured to synchronize the local license registry with the license server when the system is on-line with the license server.

* * * * *